United States Patent
Gustafsson et al.

(10) Patent No.: US 7,240,542 B2
(45) Date of Patent: Jul. 10, 2007

(54) TIRE PRESSURE ESTIMATION

(76) Inventors: Fredrik Gustafsson, S-590 71, Ljungsbro (SE); Marcus Drevö, S-582 36, Linköping (SE); Niclas Persson, S-582 16, Linköping (SE)

( * ) Notice: Subject to any disclaimer, the term of this patent is extended or adjusted under 35 U.S.C. 154(b) by 233 days.

(21) Appl. No.: 10/257,598

(22) PCT Filed: Apr. 12, 2001

(86) PCT No.: PCT/SE01/00834

§ 371 (c)(1),
(2), (4) Date: Feb. 27, 2003

(87) PCT Pub. No.: WO01/87647

PCT Pub. Date: Nov. 22, 2001

(65) Prior Publication Data

US 2003/0172728 A1    Sep. 18, 2003

(30) Foreign Application Priority Data

Apr. 12, 2000 (SE) .................................... 0001353
Jun. 13, 2000 (SE) .................................... 0002213

(51) Int. Cl.
*G01M 17/02* (2006.01)
*G01L 27/00* (2006.01)

(52) U.S. Cl. .......................................... 73/146; 702/98

(58) Field of Classification Search ....... 73/146–146.8, 73/700–756; 340/444–447; 701/36; 702/96, 702/98

See application file for complete search history.

(56) References Cited

U.S. PATENT DOCUMENTS

| | | | |
|---|---|---|---|
| 5,541,859 A | | 7/1996 | Inoue et al. |
| 5,826,207 A | * | 10/1998 | Ohashi et al. ................. 701/36 |
| 6,092,415 A | | 7/2000 | Borenius et al. |
| 6,222,444 B1 | * | 4/2001 | Wang ......................... 340/442 |
| 6,644,105 B2 | * | 11/2003 | Dieckmann et al. .......... 73/146 |

FOREIGN PATENT DOCUMENTS

DE                4339970 A1  *  6/1994

* cited by examiner

*Primary Examiner*—Edward Lefkowitz
*Assistant Examiner*—Jermaine Jenkins

(57) ABSTRACT

A method, computer program product and apparatus for estimating the pneumatic pressure of a tire on a vehicle, comprising the steps of: receiving as an input a vehicle status sensor signal; estimating first parameter values of an adaptive filter based on a predetermined model on the vehicle status dependent on the vehicle status sensor signal; calculating, dependent on said first model parameter values, a first tire pressure indication value ($\delta$) being dependent on and indicative of the pneumatic pressure of the tire. Specifically, the vehicle status signal may be an input a wheel angular velocity signal (1) and a lateral movement indication signal; the adaptive filter is based on a predetermined model on lateral vehicle dynamics dependent on the angular velocity of said wheel and the lateral movement of said vehicle.

40 Claims, 26 Drawing Sheets a, $\omega_2(nT_1)$ b, $y_8(nT_1k_4)$

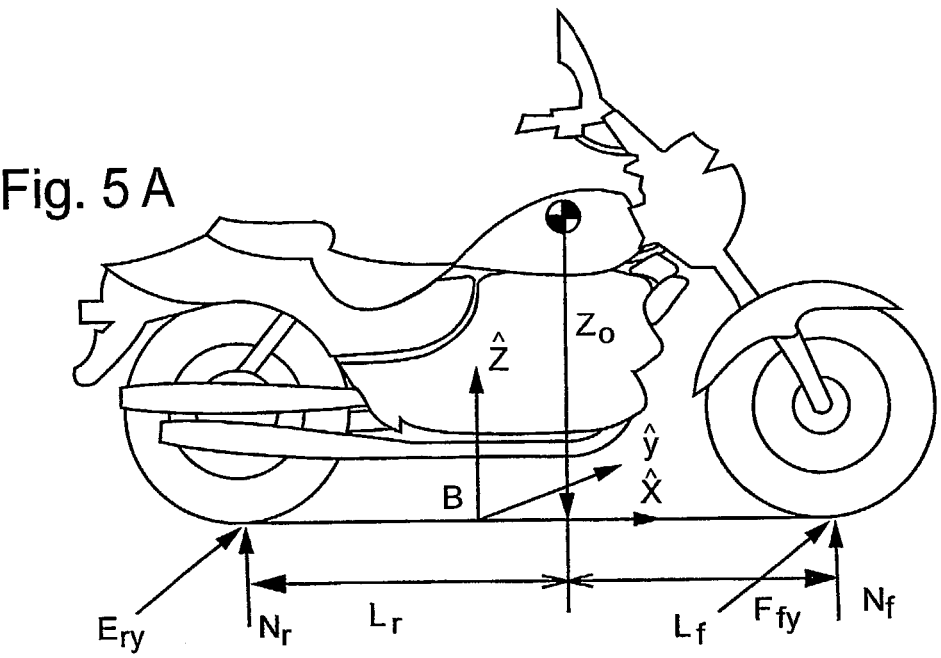
Fig. 5 A
Fig. 28
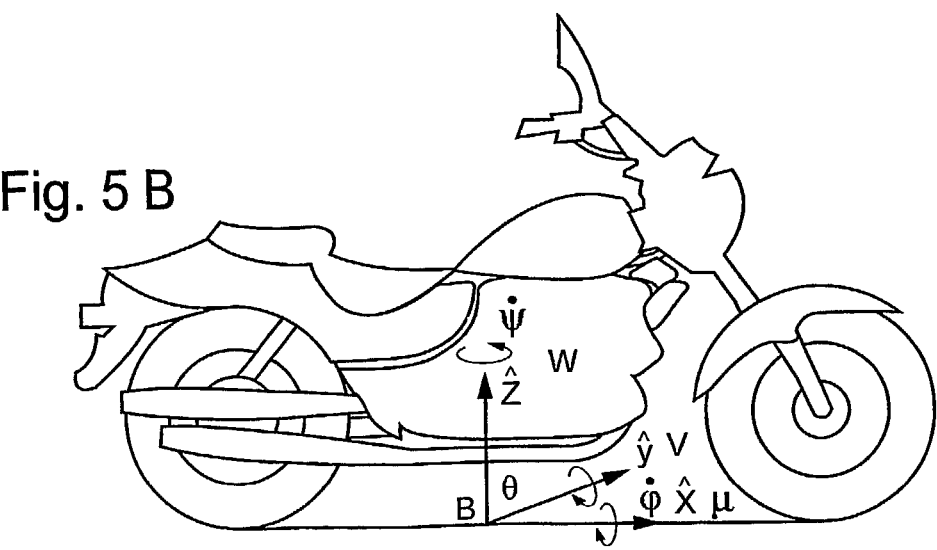
Fig. 5 B
Fig. 29

TIRE PRESSURE ESTIMATION

FIELD OF THE INVENTION

The present invention relates generally to a system for tire pressure estimation in a vehicle carried on tire fitted wheels, and more specifically to the detection and estimation of physical parameters dependent on the tire pressure.

BACKGROUND

In the design of cars and other vehicles a great deal of attention is today directed to safety aspects. One such aspect of great importance is related to the tire pressure in the wheels due to the fact that a sudden flat tire can easily cause an accident. In addition, in areas with a great risk of being robbed at the road an involuntary stop in connection with a change of wheels entails an increased personal risk for the drivers and the passengers. Another aspect more related to driving economy is based on the fact that a tire having a low air pressure is worn out faster than a correctly filled tire. An indication of the tire air pressure is therefore a means for avoiding unnecessary costs.

THE STATE OF THE ART

Direct measurement of tire pressure exists in prior art but requires a comparatively expensive equipment integrated with the tire. Traditionally, methods indirectly measuring the tire pressure are based either on a frequency analysis or on a tire radii analysis. The frequency analysis may be performed either by computation of the frequency spectrum using e.g. a Fast Fourier Transformation (FFT) or by estimation of the model parameters in a linear model of the tire. Usually, the tire is modelled as a damped spring and the estimated model parameters are related to the resonance frequency, which in its turn depends on the tire pressure.

A tire pressure system based on wheel radii analysis is disclosed for example in the U.S. Pat. No. 5,922,949 to Nakajima. Since the angular velocity increases when the wheel radius decreases, i.e. when the tire pressure decreases, the relative tire pressure is estimated by comparing the angular velocity with the vehicle speed. However, the wheel radius is also affected by wear and tear and depends on cruising states, such as cornering and braking. Wheel radii analysis generally works well in good conditions but is less accurate in case of slippage of the wheels. An estimate value of each individual tire pressure itself is not possible to obtain through this prior art technology since only the difference between the wheel radii of different wheels are investigated. Disadvantages with methods based on wheel radii analysis are for example a lack of robustness with regard to different driving styles and loss of functionality during low friction or in split μ situations, i.e. when there is different friction for different tires. A further disadvantage is that the whole algorithm fails in case of malfunction in one of the wheel speed sensors. Moreover, simultaneous pressure falls in the tires may in certain cases remain undetected due to the comparative nature of the wheel radii analysis methods.

Tire pressure systems based on frequency analysis are disclosed for example in the patent documents no. EP 0 700 798, EP 0 925 960, and U.S. Pat. No. 5,753,809.

In EP 0 700 798, the frequency analysis is performed using a Fast Fourier Transformation (FFT) on the extracted high frequency components. The result is a resonance frequency that is compared to a predefined reference frequency.

In EP 0 925 960, the wheel speed signal is filtered using a band-pass filter to achieve a wheel speed signal corresponding to the first or the second resonance peak dependent on the wheel speed. In this piece of prior art a second-order discrete time model for the frequency analysis is used instead of the Fast Fourier Transformation. The discrete time model includes two unknown parameters that are identified by the least squares method. The resonance frequency is further computed from the above mentioned two parameters and may further be related to tire pressure.

The U.S. Pat. No. 5,753,809 to Ogusu et al discloses a method estimating the tire pressure using a second-order linear prediction model for the rotational speed of the vehicle wheel and vibration of the tire using parameters identified from values of the rotational speed of each individually treated wheel. A resonance frequency is found from the identified parameters, and the tire pressure is estimated from a linear relationship between the pressure and the resonance frequency. This method decreases the computational complexity in comparison with the method using the Fast Fourier Transform, since less arithmetical processing is required. Low-capacity memory is satisfactory and the method may be implemented in a low cost system. This piece of prior art is directed to a tire pneumatic pressure estimating system and discloses the use of a wheel speed sensor positioned in each wheel. The sensor signals are gathered and combined in a signal processor, which outputs a tire pressure indicator signal for each wheel. This system is confined to producing a tire pressure signal within the accuracy limits of the wheel speed sensors.

Disadvantages found in prior art tire pressure estimation methods based on frequency analysis is a relatively weak correlation to pressure and a sensitivity to various sources of vibration e.g. dependent on the vehicle velocity.

The U.S. Pat. No. 5,629,478 to Nakajima et al discloses a method and device for detecting a pneumatic pressure drop of vehicle tires. This prior art is specifically concerned with the problem of correcting for influence on the pressure drop detection of different interfering factors such as speed, turning radius, front/rear acceleration and lateral acceleration. The correction is carried out by substituting, in the calculation of the pressure drop, a velocity value, a front/rear acceleration value, a lateral acceleration value and a turning radius value of the vehicle with a polynomial expression to determine a correction value. The polynomial expression is specifically selected such that an influence of the turning radius is exerted on all terms. This pressure drop evaluation method thus makes use of a plurality of tire pressure parameters that are all dependent on wheel radii analysis, or expressed differently, a rolling radius analysis. However, the compensating properties seem to be limited.

In short, well performing tire pressure estimation methods should compensate for a number of different phenomena such as cornering, acceleration, traction torque and friction, which may cause a virtual or experienced wheel radius difference. Prior art methods all seem to be insufficient in handling high velocities, i.e. situations when the traction torque is large.

It should be noted that a tire generally refers to thick piece of rubber or similar material fitted onto the wheels of wheeled vehicles. The rubber is usually filled with a gas, most commonly compressed air. This text applies to all kinds of tires, although the examples mostly refer to air filled rubber tires.

OBJECT OF THE INVENTION

The object of the invention is to solve the problem of providing an improved method and system for estimating the tire pressure in the wheels of a vehicle.

Aspects of the problem are:

to achieve a tire pressure indication with an improved degree of accuracy;

to provide a robustness with regard to for example various driving styles, cornering, low friction driving cases and split μ situations;

to provide a detectability of simultaneous drop of pressure in the tires.

A further aspect of the problem is to provide an improved wheel speed signal from existing wheel speed sensors.

SUMMARY OF THE INVENTION

The object of the invention is achieved by a method and a system comprising the determining or estimation of parameter values in an adaptive filter based on a predetermined or pre-selected tire pressure model, thus resulting in an adaptively determined equation system for calculating a tire pressure indication value. According to an aspect of the invention, the model is preferably based on lateral vehicle dynamics dependent on angular velocity of the wheels of a vehicle and parameters indicative of a lateral movement of the vehicle. The estimation of model parameter values is calculated dependent on the input of parameter signals indicative of lateral vehicle dynamics preferably in the shape of an angular velocity signal from one or a plurality of wheels and preferably a yaw rate signal, possibly in combination with or as an alternative a lateral acceleration signal. A tire pressure indication value, for example in the shape of a tire pressure offset value, which is dependent on and indicative of the pneumatic pressure of a tire is then calculated dependent on the model parameter values. In contrast with prior art, the invention estimates parameter values of a predetermined or pre-selected tire pressure calculation model such that the model is adapted to the current specific situation. The inventor has realised that by estimating tire pressure model parameter values in a recursive filtering process, a large number of error sources are taken into consideration and their influence on the parameter estimate value, and in the next stage the error influence on the tire pressure indication value, is suppressed.

In a further aspect of the invention, a first tire pressure indication value which is based on a first dynamical model is used in conjunction with a second tire pressure indication value based on a second, different dynamical model for tire pressure estimation. This estimation technique taken in conjunction with a specifically designed evaluation process employed in an advantageous embodiment of the invention entails a further improved application of the tire pressure indication.

The parameters of the adaptive model is preferably calculated by means of a recursive filter, preferably in the shape of an recursive least square filter or often even more advantageously a Kalman filter operating on a state space model.

An important aspect of the invention is embodied in complex models and filters integrating and comprising parameters representing different basis in terms of physical principles or dynamics, such as combinations of lateral and longitudinal dynamics or addition of other kinds of parameters such as motor parameters and road friction. Different sensor signals are integrated in these complex models thus embodying a sensor fusion.

A specific embodiment of the invention applies a combination of first estimation model in the shape of an improved frequency analysis and a second estimation model in the shape of an improved wheel radii analysis based on measured wheel speed signals. According to an advantageous aspect of the invention, the frequency analysis comprises a second-order discrete time model provided with a Kalman filter for spring parameter estimation, a feature that efficiently attenuates noise and increases the theoretical as well as the practical accuracy of the analysis. More specifically, this embodiment comprises a calculation of the friction parameter slip offset constituting a tire pressure indication value. The slip offset parameter is independent of friction and traction force, and therefore the invention provides a tire pressure estimation that is insensitive to different friction levels and is robust to different driving styles. An embodiment of the wheel radii analysis comprises a computation of:

Firstly, the relative difference in wheel radii of the front and rear wheels for the left and the right wheel pair, respectively, which gives an indicator of whether either one of the left or the right wheels has an abnormal pressure. Preferably, the relative differences in wheel radii are computed from a friction model designed to compensate for different phenomena such as cornering, acceleration, traction torque and friction, which may cause a virtual or experienced wheel radius difference.

Secondly, the relative difference in wheel radii of the left and right wheels for the front and rear wheel pair, respectively, which similarly gives an indicator of whether either one of the front or the rear wheels has an abnormal pressure. This second wheel radii analysis is based on a sensor fusion model that in addition to the signals from the wheel speed sensors takes a signal from a yaw rate gyro.

Embodiments of the invention may also comprise a wheel radius parity check in order to provide an indicator of whether one of the tires has an abnormal radius.

According to further aspects, embodiments of the invention comprises a pre-processing provided with a calibration algorithm based on an auto-regression model for the measured wheel pulse signal in order to generate an improved, computed wheel speed signal for the tire pressure estimation. In particular, this is an advantageous feature in embodiments using a wheel speed sensor that comprises a toothed wheel and an edge detector coupled to each respective wheel. Sensors of this kind are common in the standard anti-lock braking systems (ABS) of modern vehicles. A typical problem with such a toothed wheel is that neither the distance between the teeth nor the size of the teeth are uniform and consequently an inaccurate wheel speed signal is generated. This problem may get even worse during operation due to the fact that the toothed wheel generally is badly protected from mechanical damage, for instance from stones or gravel. Embodiments of the invention therefore comprise a correction method for correction of the inaccuracy emerging from the toothed wheel.

An advantage with the present invention is that the functionality works well in vehicles having any number of wheels, even in one-wheeled vehicles and perhaps more practically in two-wheeled vehicles such as motorcycles, in standard four-wheeled cars or lorries with extra wheel pairs.

Embodiments of the present invention are advantageously applied for wheel imbalance detection, surface texture estimation and surface unevenness detection. These applications are further explained below.

The invention is applicable for and adaptable to all kinds of vehicles carried on pneumatic tires, such as cars, motorcycles, lorries or trucks having any number of wheels in accordance with the different embodiments and further aspects described in the detailed description.

BRIEF DESCRIPTION OF THE DRAWINGS

The present invention will be further explained by means of exemplifying embodiments in conjunction with the accompanying drawings, in which:

FIGS. 28-32 show diagrams relating to a motorcycle application of the invention;

DETAILED DESCRIPTION OF EMBODIMENTS

General Setting

Figure 1:
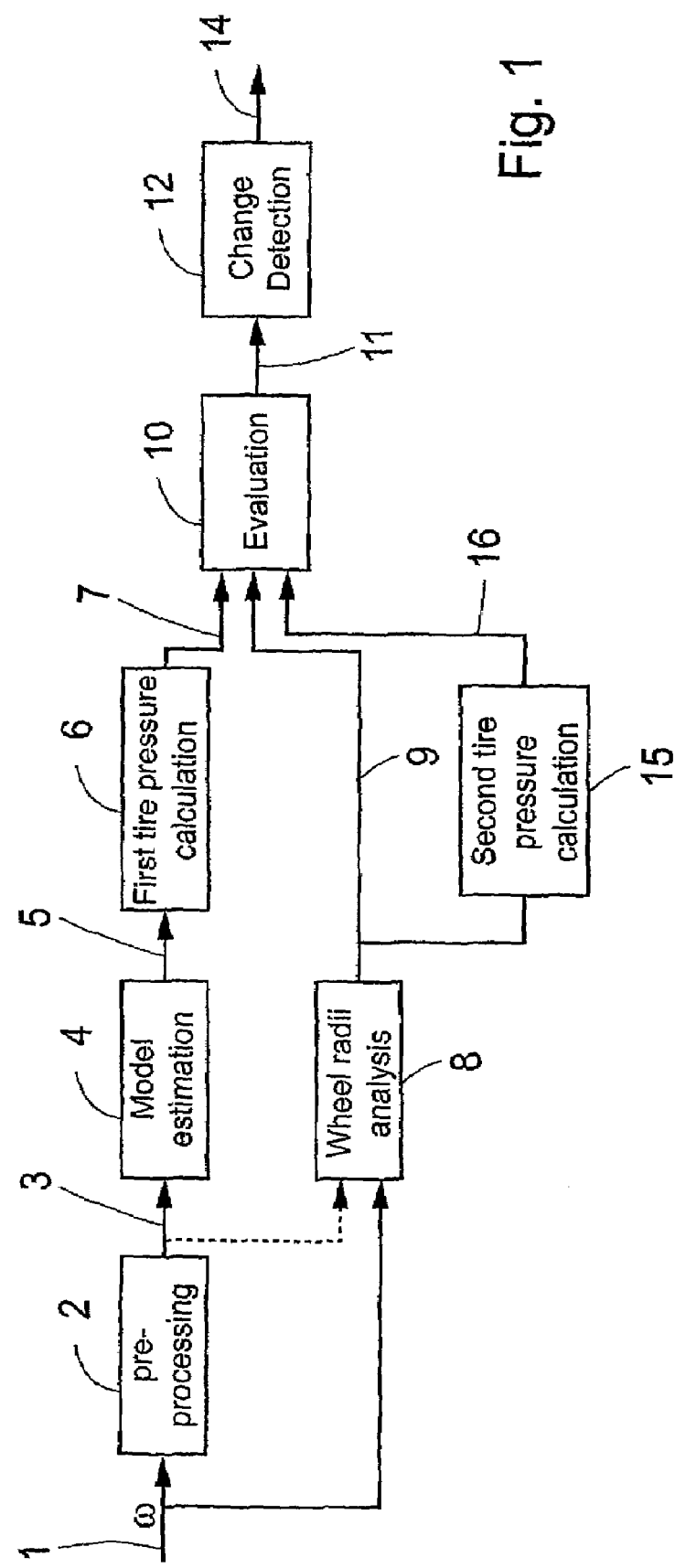
FIG. 1 shows a block diagram illustrating the general method steps as well as the functional means of an embodiment of the invention.

The invention comprises a method and a realisation of the method that may be realised in hardware, software or a combination thereof. The most feasible realisation of the invention is likely to be in the shape of a computer program product preferably comprising a data carrier provided with program code or other means devised to control or direct a data processing apparatus to perform the method steps and functions in accordance with the description. A data processing apparatus running the inventive method typically includes a central processing unit, data storage means and an I/O-interface for signals or parameter values. The invention may also be realised as specifically designed hardware and software in an apparatus or a system comprising mechanisms and functional stages or other means carrying out the method steps and functions in accordance with the description. In practice, the invention will typically be implemented in a digital or analogue sensor control system of a vehicle. Such a system includes wired, optical or wireless data communication links for communicating the output of a sensor to a control unit. The control unit itself is provided with a data processor of the above mentioned kind. The input and output of different functional blocks is in this text described in terms of signals, by which should be understood analogue signals, sampled signals or data representing the described entities or parameters.

Tire Pressure Estimation

The tire pressure estimation is calculated based at least partly on the angular velocity of each wheel subject to estimation. The angular velocity signal is preferably taken from angular velocity sensors of an anti-lock brake system (ABS) installed in the vehicle or from sensors specifically installed for the purpose of the invention. Such sensors, however, are generally not very accurate for example due to imperfections in the manufacturing and to mechanical wear. An embodiment of the invention is therefore provided with a pre-processing stage comprising a calibration of the measured sensor signal, a feature which greatly enhances the accuracy of the computed wheel speed signal. Embodiments of the inventive pre-processing and calibration algorithms, respectively, will also be further explained below. In cases where a sufficiently accurate angular velocity signal is provided, the invention is embodied without the pre-processing stage.

In one embodiment a first tire pressure estimate is calculated based on a first model of vibration phenomena, and a vibration analysis is carried out using an adaptively estimated model of the frequency spectrum of the vibrations. A first tire pressure indication value is then calculated dependent on parameter values resulting from the vibration analysis. In order to further improve the accuracy of the tire pressure indication value, the frequency based tire pressure estimation is combined with a second tire pressure estimate based on a second model, preferably involving an analysis of the wheel radii also based on the angular velocity signal.

FIG. 1 shows a flowchart illustrating the functional components as well as method steps of an embodiment of the invention. An angular velocity signal 1 or ω is received from each wheel in a pre-processing means 2 carrying out for example a calibration algorithm. Embodiments of the pre-processing also comprises a data decimation algorithm, which decreases the computational burden with a factor of up to 5 compared to a non-pre-processed signal or data sequence. A pre-processed and thereby improved angular velocity signal 3 is then transmitted to a model estimation means 4, which is devised to estimate parameters 4 upon which the tire pressure depends based on said first physical principle of vibrations. Preferably, a model estimation is carried out based on an individual frequency analysis of each wheel. A first tire pressure estimate 7 is then calculated from the parameter values 4 obtained in step 4.

In parallel, the original 1 or the pre-processed 3, as shown with the intermittent line, angular velocity signal ω is also transmitted to a second tire pressure estimation means 8, 9 for tire pressure estimation based on said second physical principle. Preferably, the second tire estimation comprises a wheel radii analysis means 8 devised to calculate the wheel radii and a second tire pressure calculation means 15 producing a second tire pressure estimate 16. In addition, different relations or estimates 9 of the respective wheel radii are possibly calculated to be used as a complement to the first tire pressure estimate 7 of step 6. Preferably, the relative difference in wheel radii of the front and rear wheels for the left and the right wheel pair, respectively, is computed from a friction model. The relative difference is used as an indication of abnormal pressure in any of the right or left wheels. In a further developed embodiment of the invention another input signal to the wheel radii analysis is taken from a yaw rate gyro and combined with a similar computation of the relative difference in wheel radii of the left and right wheels for the front and rear wheel pair respectively. The combination with the yaw rate gyro signal is used to compensate for cornering, acceleration and friction, and gives as a result an indicator of whether any of the front or the rear wheel has an abnormal pressure. Possibly, a wheel radii parity check may also be included in order to generate an indicator of whether one of the four tires has an abnormal radius.

The wheel radii analysis and embodiments using Kalman filtering in the model estimation (explained below) is preferably based on a friction model, wherein the slip s of a wheel is defined as the relative difference of a driven wheel's circumferential velocity, $\omega_w r_w$, and its absolute velocity $v_w$, thus $s=(\omega_w r_w - v_w)/v_w$. In these equations $\omega_w$ is the wheel angular velocity and $r_w$ the wheel radius. The absolute velocity of a driven wheel is computed from the velocity of the two non-driven wheels using geometrical relations. The friction coefficient μ, is defined as the ratio between the traction force, $F_t$, and the normal force, N, on the driven wheel. Said friction coefficient is also referred to as the normalised traction force. The slip slope, k, is defined as dμ/ds for μ=0, and is different for different surface textures. Said slip slope is commonly referred to as the longitudinal stiffness, but in this text slip slope is preferred. However the slip s is not zero when the traction force, $F_t$, is zero, and due to a small difference in effective wheel radii a slip offset, δ, appears. This slip offset, δ, has the advantageous feature of being independent of friction and traction force, and as is only dependent of the tire radii. The wheel angular velocity ω is computed based on the signal from the wheel speed sensor and the slip s is in its turn calculated from the angular velocity. Furthermore, the engine torque M required in some embodiments of the invention for the computation of a normalised traction force μ, is preferably calculated based upon signals from engine sensors. For the model estimation, explained below, the parameters ω and μ, are then input into an adaptive filter, e.g. a Kalman filter, adaptively estimating the slip slope, k, and the slip offset, δ.

Returning to FIG. 1, the first tire pressure estimate 7 as well as the second tire pressure estimates 16 and possibly also the wheel radii computations 9 are then received in an evaluation means 10 devised to evaluate the input signal and to calculate a resulting tire pressure estimate 11. Thereby, first tire pressure estimates 7 from driving situations which are handled with uncertainty in the frequency based model estimation are corrected or compensated for by means of the wheel radii dependencies on the actual tire pressure. Examples of such driving situations compensated for are cornering, acceleration and friction. Described in a different wording, the evaluation means 10 is in fact a means for fusion of different sensor signals or different signals derived from the same sensor in order to make an optimised use of the available information. Experimental tests have shown that a tire pressure estimation deviating as little as about 15% from the real tire pressure is achievable with the invention.

As finally shown in FIG. 1, the resulting tire pressure estimate 11 is according to one exemplifying embodiment transmitted to a change detection means 12 devised to generate an alarm signal in response to detected changes according to predetermined rules. For example, a first alarm signal may be generated if the tire pressure of one tire decreases more than 25% in a short time interval indicating a puncture, and a second alarm may be generated if the tire pressure increases above a predetermined level.

Four-Wheeled Vehicle Application

Figure 2:
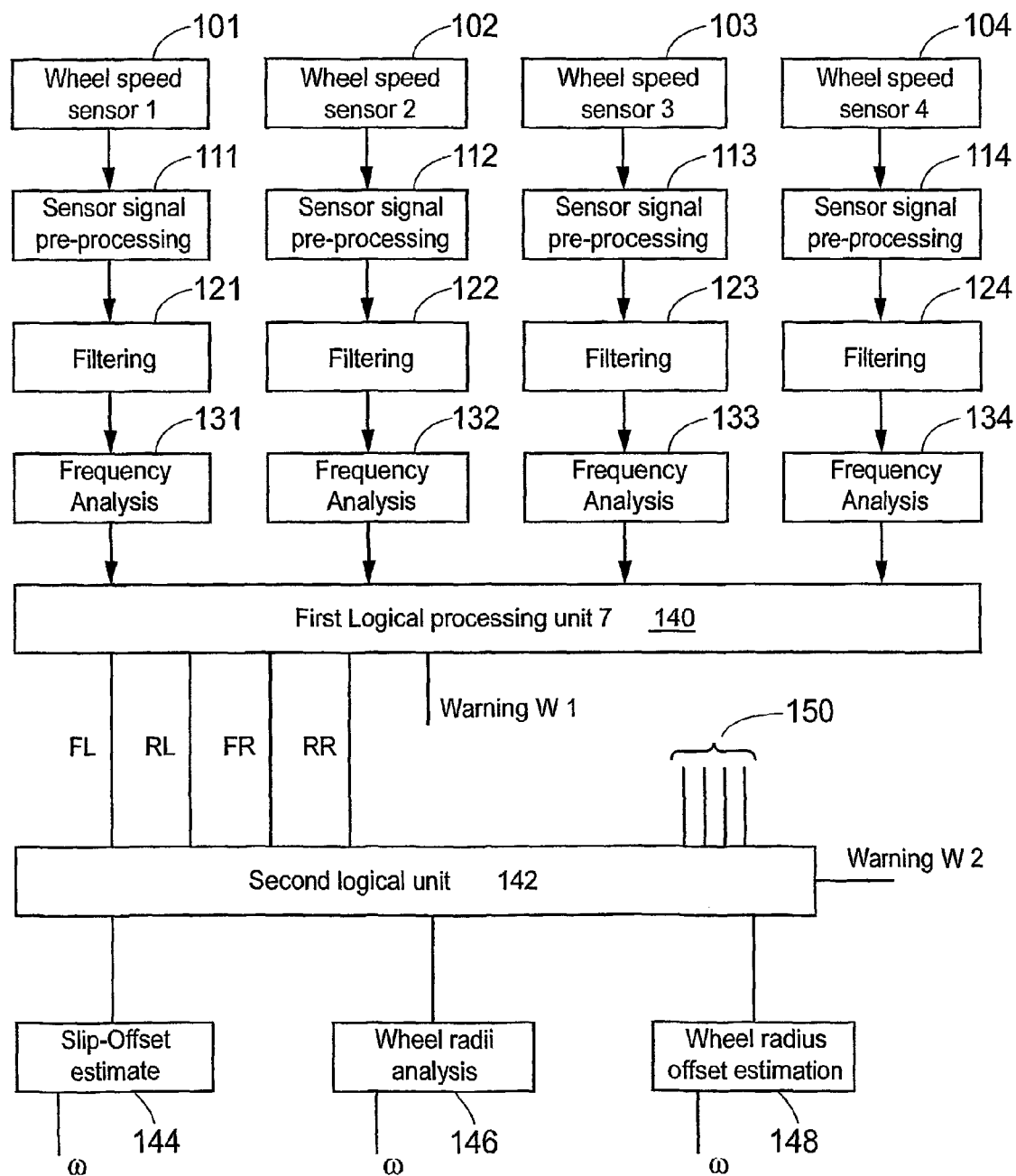
FIG. 2 shows a block diagram illustrating an embodiment of the invention applied in a four-wheeled vehicle.

In FIG. 2, an embodiment of the invention is shown by means of a block diagram representing method steps as well as functional units of the invention. The shown embodiment is designed for tire pressure estimation in a four wheel vehicle, and it should be appreciated that embodiments adapted for other numbers of wheels would have the same basic structure. This embodiment comprises or utilises a wheel speed sensor 101, 102, 103, 104 detecting the angular velocity for each wheel. The wheel speed sensors are preferably existing equipment in the vehicle, for example provided in connection with an anti-lock breaking system (ABS).

The signal from each wheel speed sensor is individually pre-processed by sensor signal pre-processing means 111, 112, 113, 114 and is then filtered by an adaptive or recursive filtering means 121, 122, 123, 124 adapted for a frequency model estimation and calculation of parameter values upon which the tire pressure depends. A frequency analysis is then carried out in frequency analysis means 131, 132, 133, 134 on the obtained parameter values and generates for each wheel a calculated tire pressure signal, which is transmitted to a first logical unit 140. In the first logical unit 140, the calculated tire pressure signals are processed e.g. with regard to predetermined threshold values and tire pressure signals for the front left wheel FL, the right left wheel RL, the front right wheel FR and the rear right wheel RR, respectively, are generated and output from the first logical unit 140. Possibly in addition or alternatively, one or several warning signals W1 is generated and output from said first logical unit 140.

A further development of the invention may also comprise a second logical unit 142, into which the tire pressure signals FL, RL, FR, RR are input. The second logical unit 142 is optionally also coupled to a means for slip offset estimation 144 devised to perform a slip offset estimation based on the original angular wheel velocity signal from wheel speed sensors 101, 102, 103, 104 or the pre-processed angular velocity from the pre-processing means 111, 112, 113, 114. The input of angular wheel velocity is in FIG. 2 for the sale of simplicity shown as ω. The estimated slip offset values for each wheel are transmitted to the second logical unit 142 as an input to a further improved evaluation and estimation of the tire pressures. Similarly, there may also be provided wheel radii analysis means 146 or wheel radius offset estimation means 148 adding information for improved estimation of the tire pressures. The second logical unit 142 is adapted to generate a second set of improved tire pressure signals 150 for the wheels or a warning signal W2 dependent on predetermined rules.

Pre-processing

Figure 3:
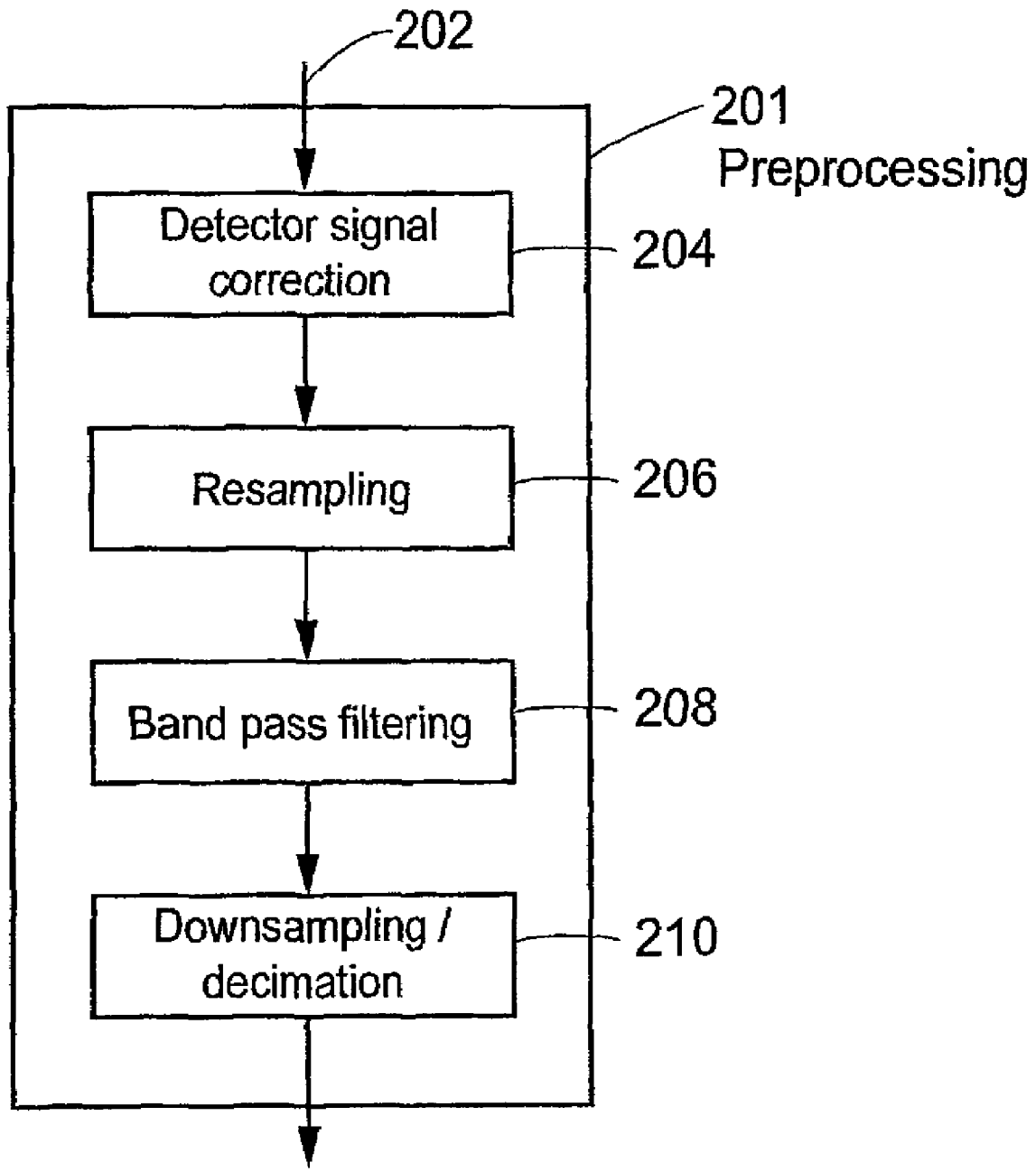
FIG. 3 shows a block diagram of an embodiment of the sensor signal pre-processing shown in FIG. 1.

The purpose of the pre-processing stage is to enhance the quality of the signal upon which the model estimation is based. An embodiment of the pre-processing means adapted for this specific type of measurement device is described as an example. Other types of sensors applied in the invention would need a similar general pre-processing scheme but the details would be adapted to the specific correction problems in each case. FIG. 3 shows an embodiment of a pre-processing method as well as the functional means for carrying out the method. An angular velocity signal 202 from a wheel speed sensor is thus input in a pre-processing means 201 which comprises a sequence of a detector signal correction means 204, a re-sampling means 206, a band pass filtering means 208 and a down-sampling/data decimation means 210.

Detector Signal Correction

The most common angular wheel velocity measurement device in modern standard cars and other vehicles is based on a toothed wheel arranged on and rotating with the vehicle wheel and a sensor, e.g. an optical or an inductive sensor, detecting each tooth edge. The time elapsed between the detection of the two last tooth edges is measured and an angular velocity is calculated with the equation:

$$\omega=(2\pi/N)\cdot \Delta t [rad/s] \quad (1)$$

where N is the number of teeth on the toothed wheel and Δt is the elapsed time between two detected teeth. A problem with this type of devise is that the toothed wheel is usually not ideal for example due to mechanical tolerances in the production, i.e. the distance between the teeth and the sizes of the teeth are not completely uniform and thereby the angle increment between all teeth is typically not uniform. Furthermore, the toothed wheel is often insufficiently protected against mechanical damage and deformation for example from stones or gravel. These and other phenomena make the angular velocity signal incorrect.

Figure 4:
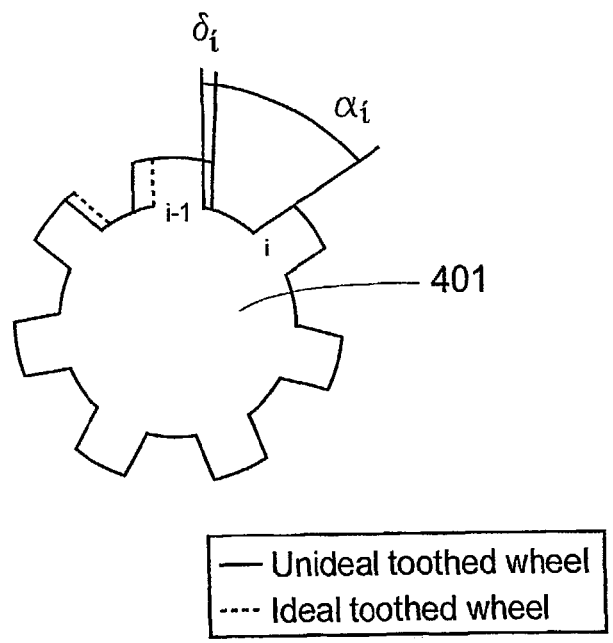
FIG. 4 shows a toothed wheel of a wheel speed sensors used in connection with the invention.
Figure 5:
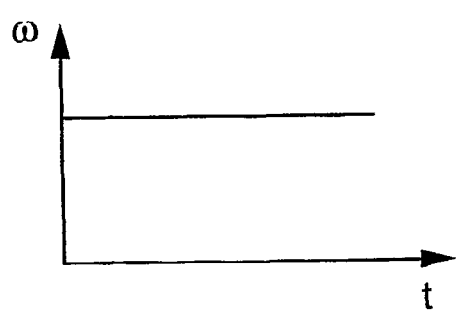
FIG. 5A shows a diagram of the angular wheel velocity signal output from an ideal toothed wheel.
FIG. 5B shows an exemplifying diagram of the angular wheel velocity signal output from an unideal toothed wheel.
Figure 5:
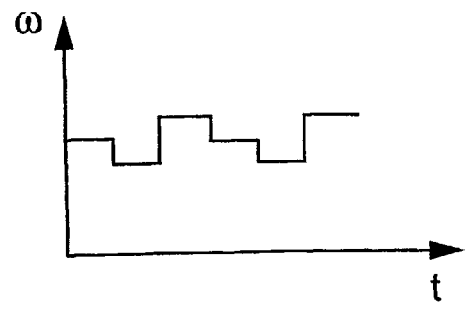
Figure 6:
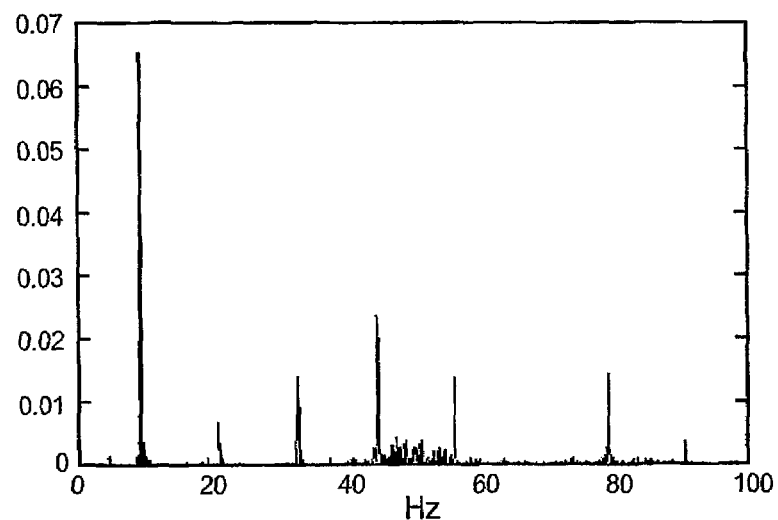
FIG. 6 shows a diagram of an energy spectrum of an uncorrected angular wheel speed signal.

FIG. 4 illustrates a toothed wheel 401 wherein the outline of an ideal wheel is drawn with an intermittent line and a more realistic, not ideal wheel is drawn with a full line. The $\alpha_i$ is the real angle between teeth i and i-1 and $\delta_i$ is the offset error. FIG. 5A shows the angular velocity, as a function of the time t and for a car travelling with a constant velocity, the theoretical output signal ω from a wheel speed sensor having an ideal toothed wheel and thus resulting in a constant ω. FIG. 5B shows similarly an example of an output signal ω from a real, imperfect toothed wheel sensor, resulting in a periodically constant ω with the periodicity N, i.e. the number of teeth. In the frequency domain, the periodic disturbances in the angular velocity signal cause an impulse with large number of harmonic components. FIG. 6 shows an energy spectrum of an uncorrected angular wheel speed signal, in which spectrum the components originating from the imperfect toothed wheel dominate and makes other frequency components unobservable. The interesting parts of the signal often have the same frequencies as the disturbances.

The period of the periodically constant velocity signal is the same as for the vehicle wheel itself, i.e. with a normal wheel having a circumference of approximately 1,8 m and a vehicle velocity of 80 km/h the wheel rotates on lap in $T_{lap}=1.8/(80/3.6)=0.081$ s. This is equivalent with a frequency of $f_{lap}=1/0.081=12.3$ Hz. This should be compared with the theoretical fact that the imperfections from the toothed wheel have a fundamental frequency at about v/(3.6*1.8) Hz, thus depending on the actual velocity v. As plotted in FIG. 6 the fundamental frequency of the impulses is at about 11.6 Hz, which corresponds well to the theoretical frequency of the toothed wheel. FIG. 6 thus shows an the frequency spectrum, i.e. the Fourier transform of an uncorrected wheel speed signal and illustrates the distortion caused by mechanical errors.

According to the invention, the imperfections of the toothed wheel are identified and thereafter the disturbances originating from the toothed wheel are eliminated from the angular velocity signal. Again referring to FIG. 4, the offset errors $\delta_i$ are identified in order to find the correction factors. The real angle $\alpha_I$ is unknown but can be approximately calculated with:

$$\alpha_i=\omega\cdot\Delta t \quad (2)$$

where ω is the current angular velocity of the wheel. The current wheel speed ω can be calculated in different ways, and in order to keep the algorithm causal only old measurements are used in accordance with the invention. In one embodiment ω is calculated using the average velocity during the last lap, according to $$\omega=2\pi/(t_i-t_{i-N}). \quad (3a)$$

Preferably, an adaptive algorithm, e.g. a general Recursive Least Squares (RLS) or a Kalman filter algorithm is used to identify the offset error. The advantage with using an adaptive algorithm like RLS is that if new errors occur it adapts to the new toothed wheel. With this approach the angular velocity is expressed as:

$$\omega=(2\pi/N+\Theta_i)/\Delta t. \quad (3b)$$

The linear regression model for identifying the errors of the toothed wheel pertaining to mechanical causes is:

$$y(t_i)=\omega(t_i)\cdot\Delta t_i-2\pi N$$

$$\theta=(\delta_1\ \delta_2\ \ldots\ \delta_N)^T$$

$$\phi(t_i)=(0\ 1\ \ldots\ 0)\ \text{position } i \bmod N \text{ is } 1$$

$$\omega(t_i)=2\pi/(t_i-t_{i-N})$$

$$\Delta t_i=t_i-t_{i-1} \quad (4)$$

$$\sum_{i=1}^{N} \delta_i = 0$$

In equation 4 ω is the current angular velocity, N is the number of teeth and $t_i$ is the time when the last tooth passed the sensor. The current angular velocity is not available and is therefore calculated from the past data. The past data can be taken from an arbitrary number of revolutions (k), but there is a trade-off between sensitivity and delay for the signal. As an additional constraint the sum of the whole offset must be 0.

The solution of a linear regression model with RLS is:

$$y(t) = \varphi^T(t)\theta + e(t) \text{ regression model} \quad (5)$$

$$\hat{\theta} = \hat{\theta}(t-1) + K(t)[y(t) - \varphi^T(t)\hat{\theta}(t-1)]$$

$$K(t) = P(t)\varphi(t)$$

$$P(t) = \left[P(t-1) - \frac{P(t-1)\varphi(t)\varphi^T(t)P(t-1)}{\lambda + \varphi^T(t)P(t-1)\varphi(t)}\right]/\lambda$$

The offset errors ($\delta_1$ $\delta_2$ . . . $\delta_N$) are then estimated by combining equations (4) and (5) and applied them to the signal from the angular velocity measurement unit.

Figure 7:
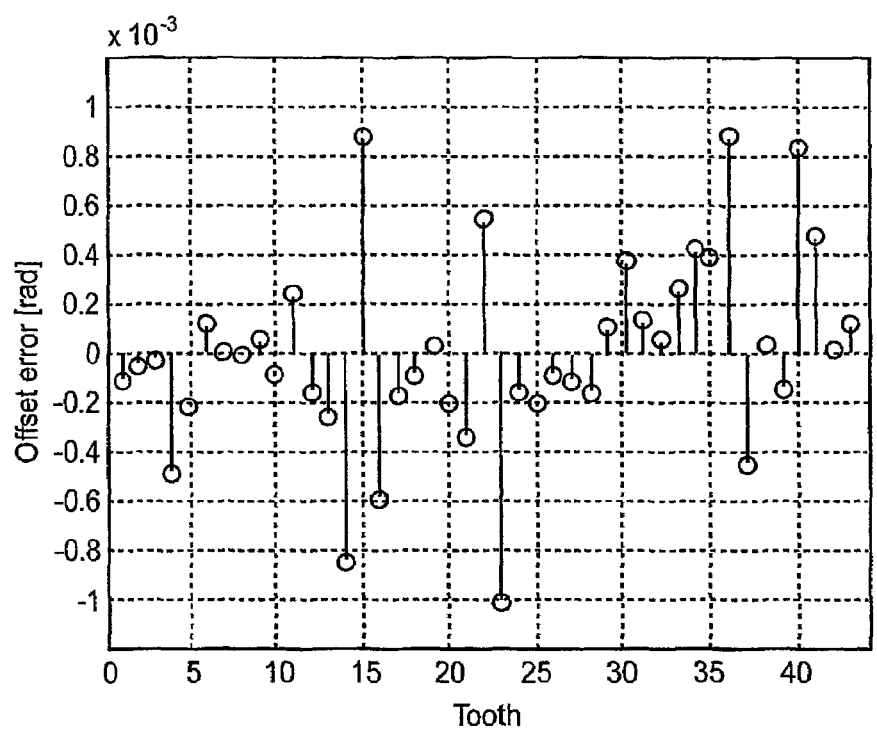
FIG. 7 shows a diagram of offsets in radians plotted for the tooth of a toothed wheel.

Typical offset errors estimated by means of the described algorithm are shown in FIG. 7, the offset error in radians is plotted for each tooth. As seen in FIG. 7, some teeth have relatively large offsets which distort the wheel speed signals quite prominently. When the offset errors are identified the wheel speed signal is corrected by for example:

$$\alpha_{i,corr} = \frac{2\pi}{N} + \delta_i \quad (6a)$$

$$\omega_{corr} = \frac{\alpha_{i,corr}}{\Delta t_i}$$

wherein the angle is corrected with the identified mechanical errors before the correct wheel speed signal is calculated.

In a second alternative the wheel speed signal is corrected by:

$$\Delta t_{i,corr} = \Delta t_i - \delta_i / \omega(t_i) \quad (6b)$$

$$\omega_{corr} = \frac{2\pi}{\Delta t_{i,corr}}$$

wherein the time elapsed between the last two teeth is corrected with the knowledge of the mechanical errors before the correct wheel speed signal is calculated.

In the equations 6a and 6b here Δt is the original signal, δ is the offset for the actual teeth and ω current wheel speed using calculated e.g. with equation 3.

Figure 8:
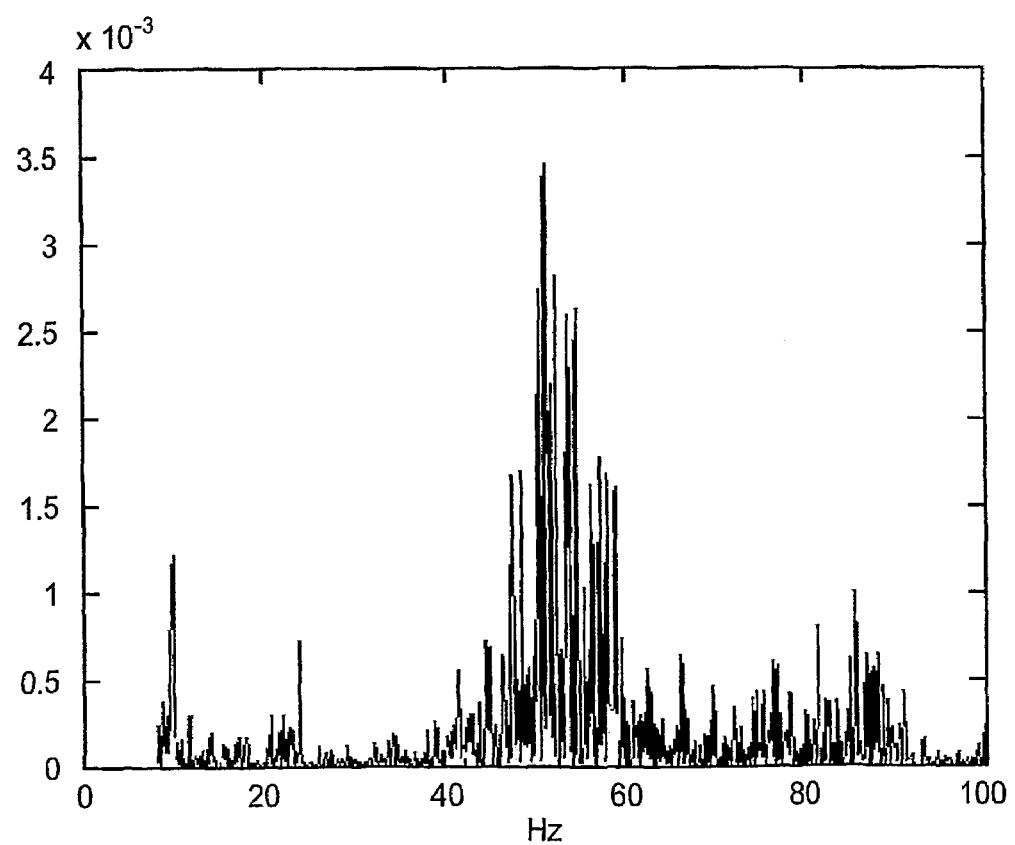
FIG. 8 shows a diagram of the resulting energy spectrum of an angular wheel speed signal after correction in accordance with the invention.

In FIG. 8 the resulting energy spectrum, i.e. the Fourier transform of the wheel speed signal after correction is presented, and it is clear that almost all harmonics due to distortion from mechanical errors are totally eliminated and the real signal components can be extracted.

Figure 9:
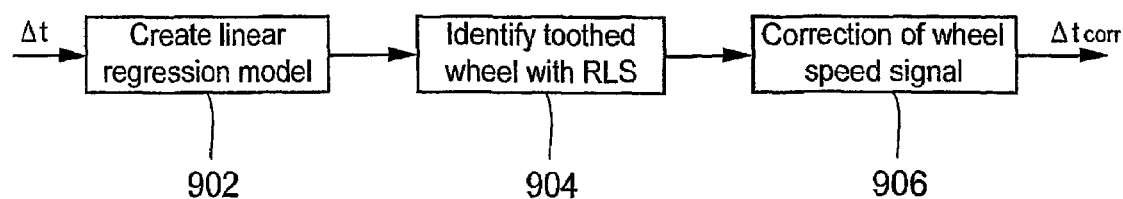
FIG. 9 shows a general block diagram of the toothed wheel correction in accordance with the invention.
Figure 9B:
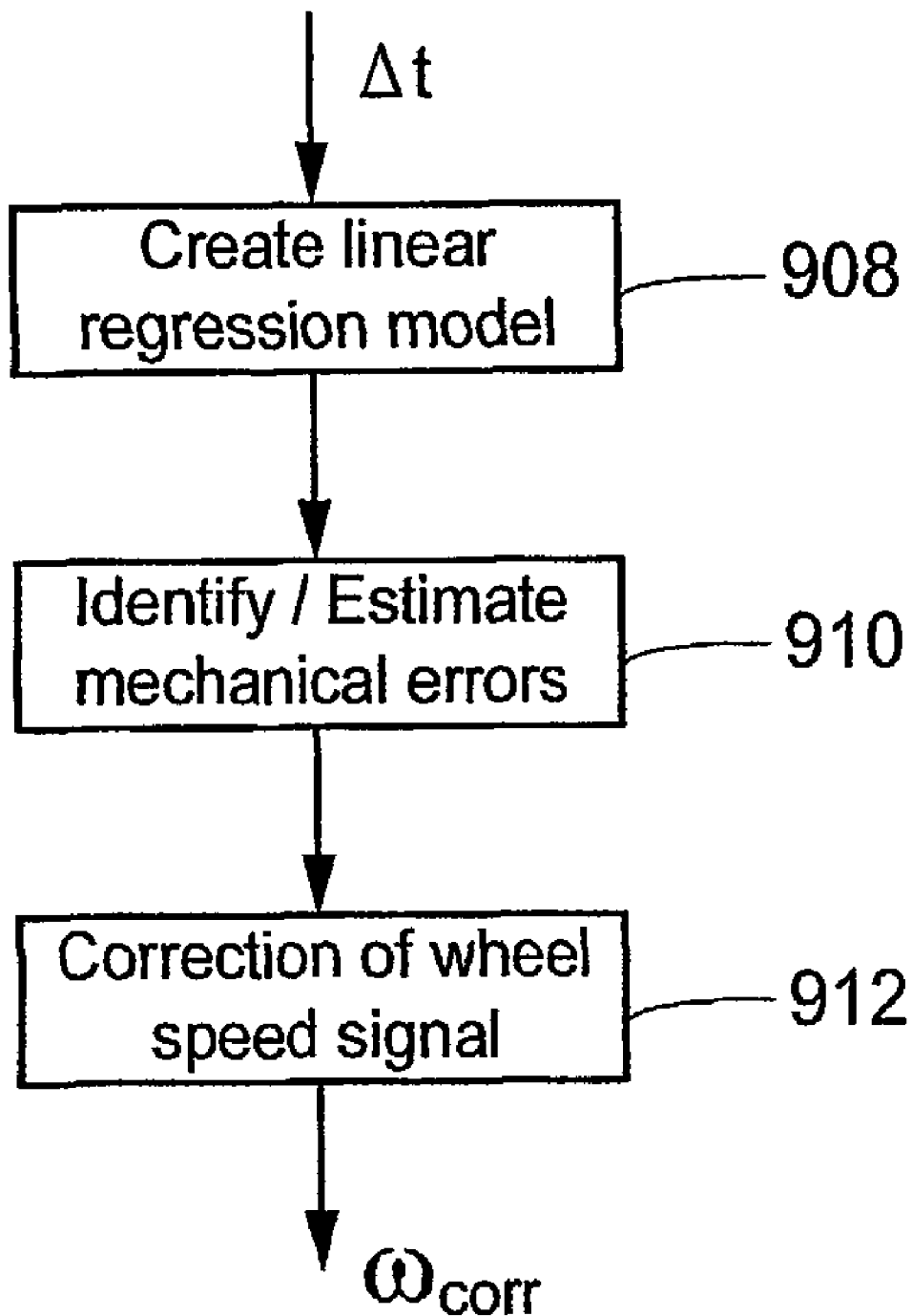

FIG. 9A shows a flow diagram summing up the described embodiment used in a variety of the detector signal correction 204 of FIG. 3, thus taking as an input the elapsed time between two teeth Δt upon which a linear regression model is created 902. Based on the linear regression model the toothed wheel is identified with an RLS and the offset errors are estimated 904. Thereafter, a correction of the wheel speed signal is carried out 906 and a corrected elapsed time Δtcorr is output. Similarly, FIG. 9B shows the alternative correction process used in a alternative variety of the detector signal correction 204 of FIG. 3, inputting Δt into a step of creating a linear regression model 908, identifying and estimating the offset due to mechanical error 910, correcting the wheel speed signal and outputting a corrected ωcorr.

Re-sampling and Reduction of Sampling Frequency

The re-sampling process 206, band pass filtering 208 and the down-sampling 210 in the pre-processing as described in FIG. 3 is described in conjunction with FIGS. 10 to 17.

Figure 10:
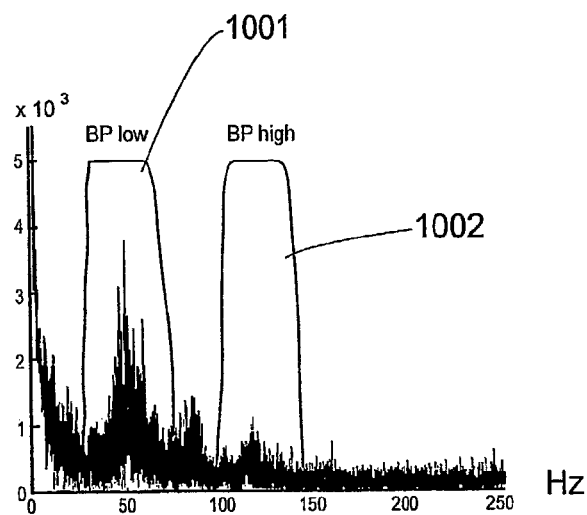
FIG. 10 shows a diagram of a exemplifying energy spectrum in the frequency domain for an angular velocity signal of a car.

The most feasible application of the invention is in a digital control system where the angular velocity signal ω(t) from a wheel speed sensor is sampled and the sampled signal or data ω($nT_1$), with the sampling frequency of $$\frac{1}{T_1},$$

is available to the system components. As explained above, this is sufficient information for a tire pressure estimation to be independently estimated for each wheel, in particular in a low pressure interval. When carrying out the frequency analysis there are basically two pressure dependent frequency intervals from which information about the tire air pressure can be extracted. These two intervals are here referred to as the low frequency interval and the high frequency interval, respectively. FIG. 10 shows an exemplifying energy spectrum in the frequency domain for an angular velocity signal of a car, wherein the low frequency interval 1001 and the high frequency interval 1002 are indicated.

The low frequency component is substantially due to the fact that the side of the wheel is elastic, and consequently a vibration may occur if the corresponding frequencies are excited. This frequency is highly dependent on the tire type, since different tire types have different elasticity. The high frequency substantially originates in the tire tread, and since the size of the tire tread is much smaller than the wheel, the frequency from the tire tread is high.

Figure 11:
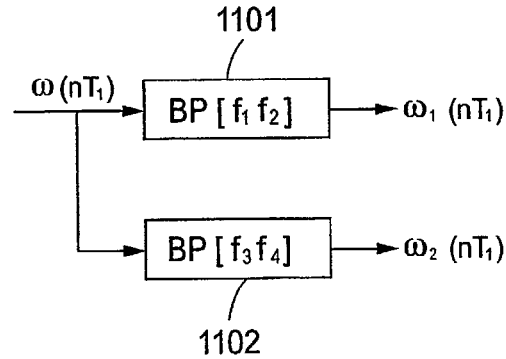
FIG. 11 shows a flow chart of the separation of frequency bands in an angular velocity signal.

In one embodiment of the invention, information from both intervals are used in order to reduce the sample frequency and thereby also reduce the data rate. Therefore, the frequency information from the two frequency intervals is separated by means of two band pass filters. FIG. 11 shows a flow chart of such a separation wherein a sampled angular velocity signal ω($nT_1$) is input into a first band pass filter 1101 having a low pass band in the interval [$f_1$ $f_2$] Hz and into a second band pass filter 1102 having a high pass band in the interval [$f_3$ $f_4$] Hz. The output from the lower band pass filter 1101 is a first new signal $\omega_1$($nT_1$) and from the higher band pass filter is a second new signal $\omega_2$($nT_1$). Thereafter, the lower frequency interval spectrum is moved to [0 $f_2$-$f_1$] Hz and the higher frequency interval spectrum is moved to [0 $f_4$-$f_3$] Hz in, and in connection with the frequency move a reduction of the sample frequency is carried out.

Figure 12:
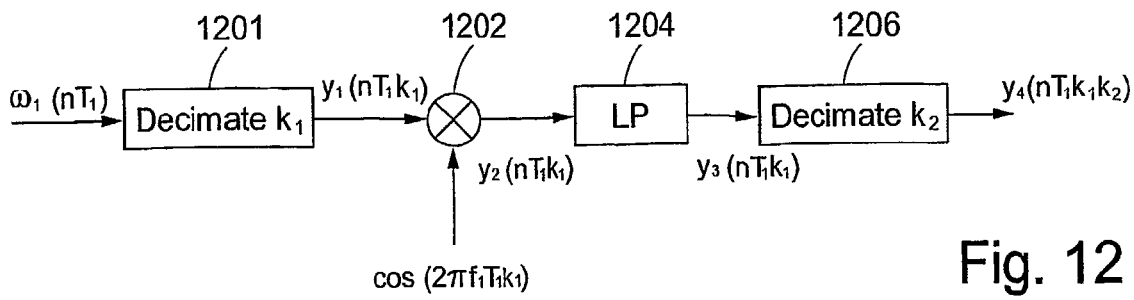
FIG. 12 shows a flow chart of the inventive reduction of the sample frequency in the lower frequency band.
Figure 13:
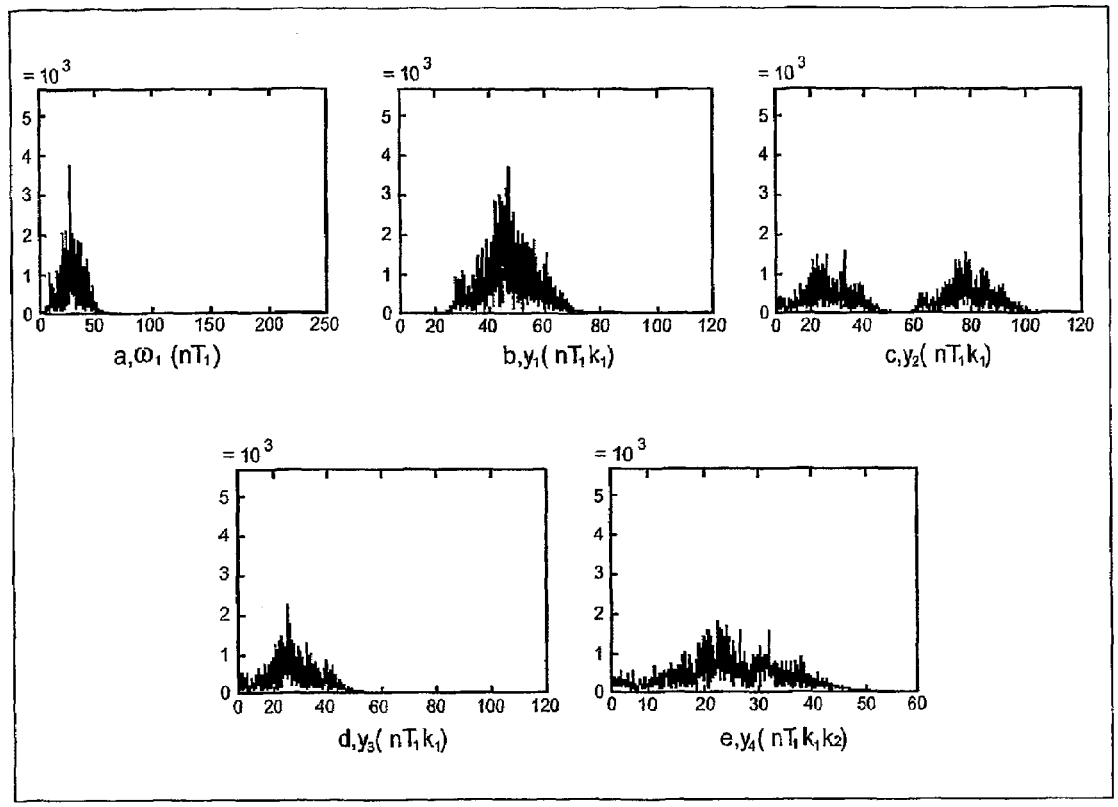
FIG. 13 shows diagrams of frequency spectra of signals from different steps of the reduction process in the lower frequency band.

FIG. 12 shows a flow chart of the steps for moving the frequency spectrum and for reducing the sample frequency in the lower frequency band. The sampled signal $\omega_1(nT_1)$, shown in FIG. 13a, is input into a data decimation stage 1201 which decimates the data with a factor $k_1$ by saving every $k_1$:th sample and discarding the rest of the samples. The decimation results in a signal $y_1(nT_1k_1)$, which is plotted in FIG. 13b. The signal $y_1(nT_1k_1)$ is thereafter modulated in stage 1202 with $\cos(2\pi f1T1\ k_1)$ thereby generating the modulated signal $y_2(nT_1k_1)$, which is plotted in FIG. 13c. In order to enable further decimation the signal $y_2(nT_1k_1)$ is filtered through a low pass (LP) filter 1204, thereby avoiding aliasing. The result of the low pass filtering is a signal in $y_3(nT_1k_1)$ plotted in FIG. 13d. Finally, the signal $y_3(nT_1k_1)$ is in stage 1206 decimated by a factor $k_2$, by saving every $k_2$:th sample and discarding the rest of the samples. The thus output signal from this data decimation process has a sample frequency that is reduced from $$\frac{1}{T_1}$$

in the input signal to $$\frac{1}{T_1 k_1 k_2}$$

of the resulting output signal $y_4(nT_1k_1k_2)$ plotted in FIG. 13e is thereafter available for processing.

Figure 14:
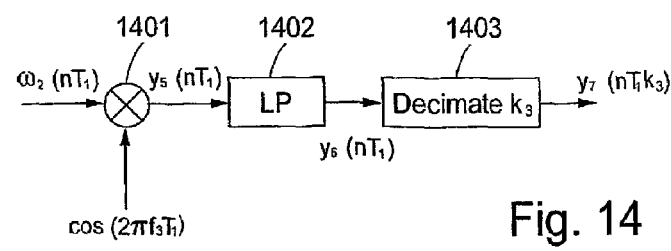
FIG. 14 shows a flow chart of the inventive reduction of the sample frequency in the higher frequency band.
Figure 15:
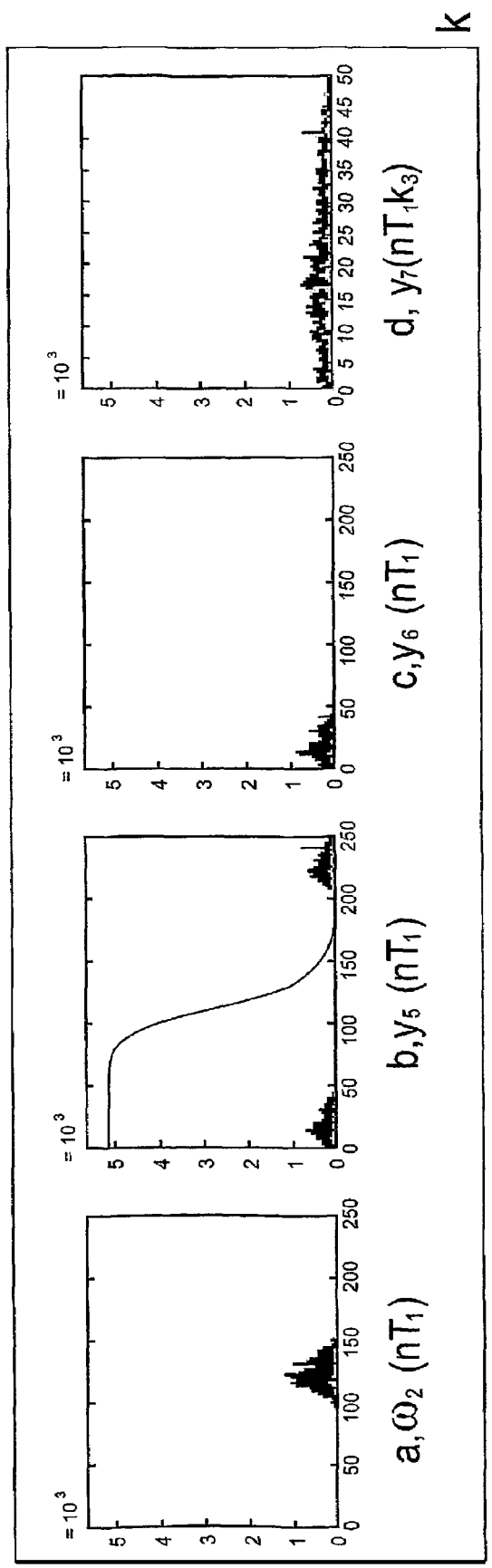
FIG. 15 shows diagrams of frequency spectra of signals from different steps of the reduction process in the higher frequency band.

FIG. 14 shows a similar flow chart of the steps for reduction of the sample frequency in the higher frequency band. The sampled signal $\omega_2(nT_1)$, shown in FIG. 15a, is modulated in stage 1401 with $\cos(2\pi f3T1)$ thus using the frequency f3 and thereby generating the modulated signal $y_5(nT_1)$, which is shown in FIG. 15b. The signal $y_5(nT_1)$ is then filtered for example through a low pass (LP) filter 1402, removing the component which will cause an alias for the decimation step. The result of the low pass filtering is a signal in $y_6(nT_1)$, plotted in FIG. 14c, which is input into a data decimation stage 1403 which decimates the data with a factor $k_3$ by saving every $k_3$.th sample and discarding the rest of the samples. The decimation results in a signal $y_7(nT_1k_3)$, which is plotted in FIG. 15d. The thus output signal from this data decimation process has a sample frequency that is reduced from $$\frac{1}{T_1}$$

in the input signal to $$\frac{1}{T_1 k_3}$$

of the resulting output signal $y_7(nT_1k_3)$ and is available for processing.

Figure 16:
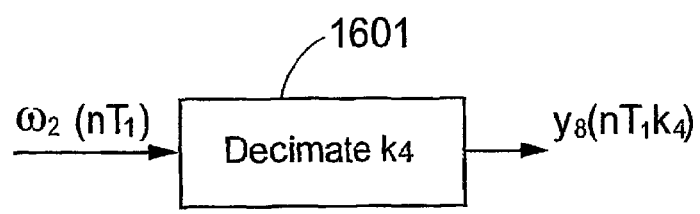
FIG. 16 shows a general flow chart of a data decimation functionality using aliasing.
Figure 17A:
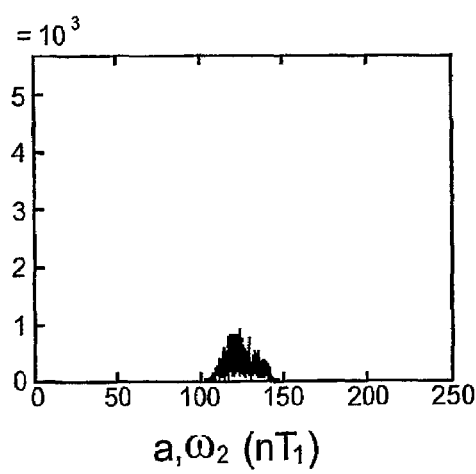
FIG. 17A shows the input and output signals of the data decimation using aliasing.
Figure 17A:
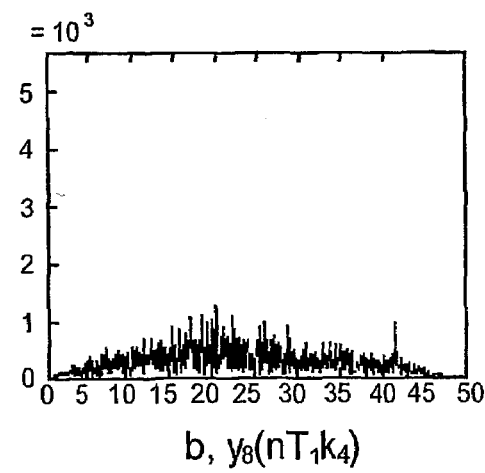
Figure 17B:
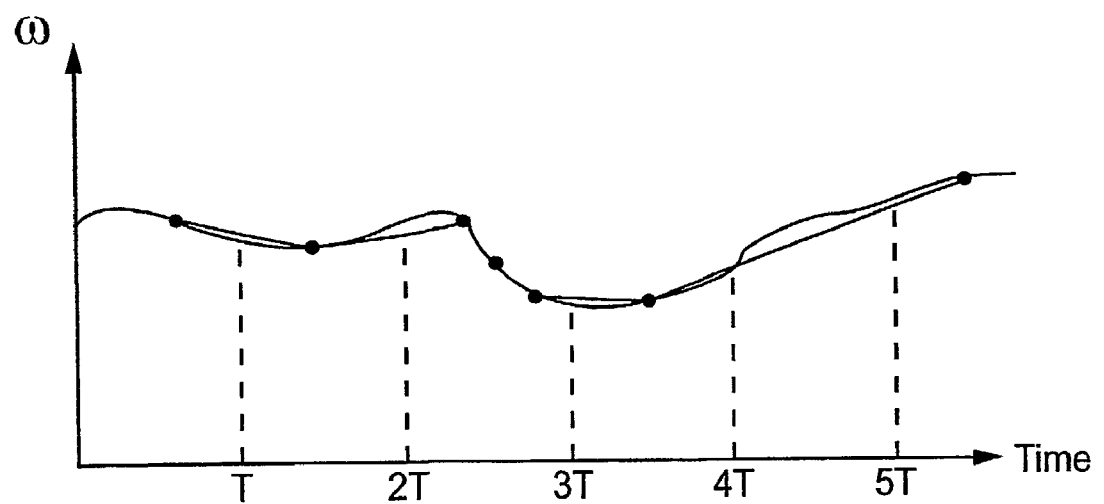
FIG. 17B illustrates interpolation.
Figure 17C:
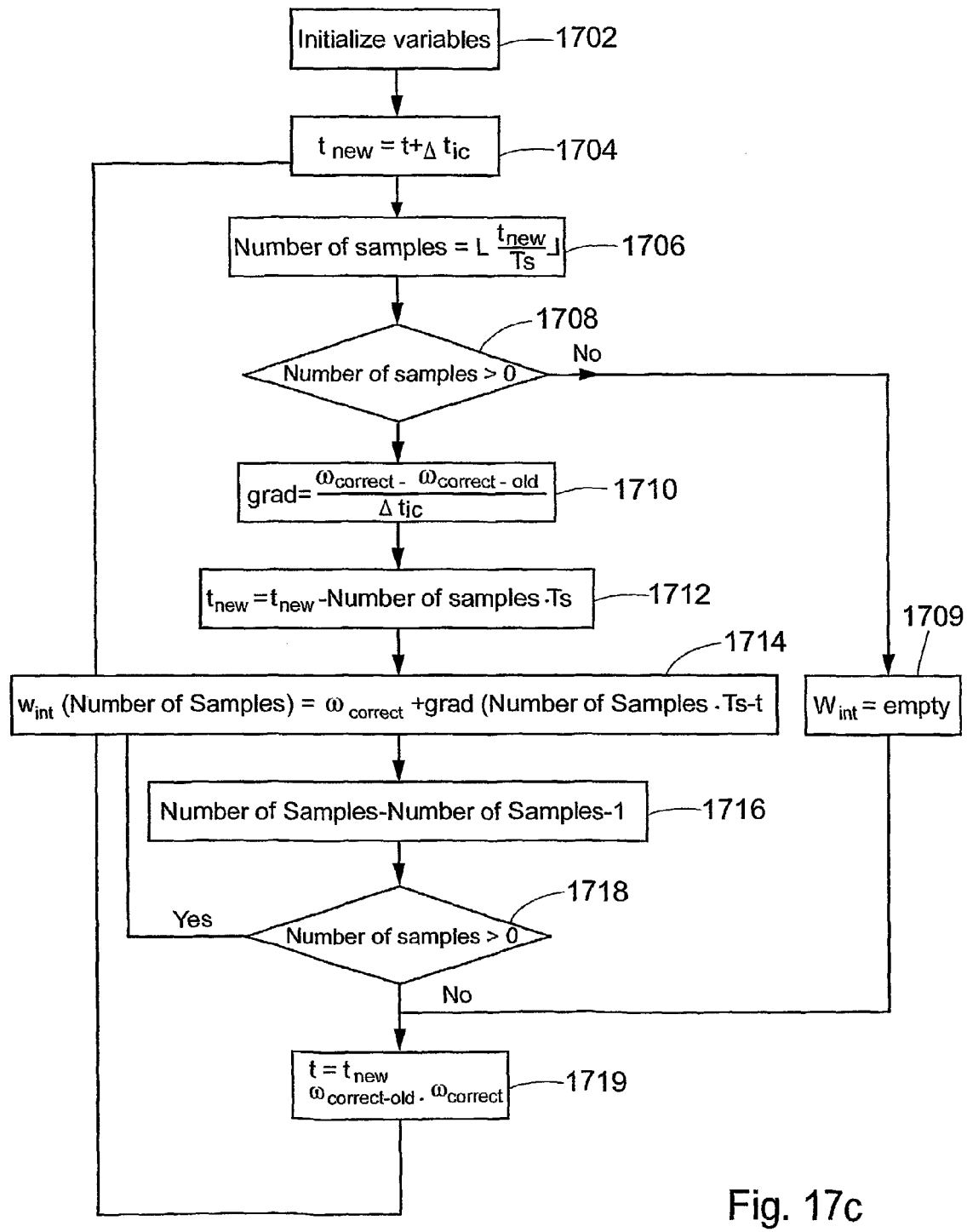
FIG. 17C shows a flow chart of an interpolation process.

The modulation technique described above in connection with the data reduction schemes is computationally rather expensive, in particular for the high frequency interval where a great deal of signal processing has to be carried out at the original sampling frequency. An alternative embodiment of the invention is therefore based on a utilisation o the aliasing phenomenon. This embodiment is shown by way of an example applied on the high frequency interval. FIG. 16 shows a flow chart wherein the high frequency angular velocity signal $\omega_2(nT_1)$ is input in a data decimation stage 1601, which decimates the data with a factor $k_4$ and outputs the resulting signal $y_8(nT_1k_4)$ by saving every $k_4$:th sample and discarding the rest of the samples. The input signal $\omega_2(nT_1)$ as well as the output signal $y_8(nT_1k_4)$ are shown in FIGS. 17a and 17b, respectively.

Interpolation of Non-equidistant Data

When signals from for example the ABS in a pre-processing stage have been corrected regarding imperfections in the toohted wheel, the data is interpolated in order to enable use of standard theory for equidistantly sampled systems. The idea behind interpolation is to convert data $\omega_1(t_1)$, $\omega_2(t_2)$, $\omega_3(t) \ldots$ collected at time $t_1, t_2, t_3 \ldots$ to a new data sequence $\omega_1'(t_0)$, $\omega_2'(t_0+T)$, $\omega_2'(t_0+2T)$, $\ldots$ This process must be performed online and several methods such as linear interpolation or spline interpolation are possible. FIG. 17B illustrates the idea behind interpolation, i.e. comprising the steps to:

1. Find the last sample taken at time<nT
2. Find the first sample taken at time$\geq$nT
3. Calculate the gradient between said last and said first values
4. Calculate the value at time nT using the interpolation along the straight line The implementation is straightforward and one alternative for linear interpolation is illustrated as a flow chart in FIG. 17C, comprising the steps of 1702-1719.

BP-filtering to Prepare Signal for Model Identification

In embodiments identifying a low order parameter model, such as AR(2), to estimate the tire pressure in a vibration based model, the resonance frequency is preferably separated from other disturbances. This is achieved using a digital band pass (BP-) filter expressed in the form $$y(n) = a_1 y(n-1) + \ldots + a_N y(n-N) + b_0 x(n) + b_1 x(n-1) + \ldots + b_M x(n-M) \quad (7)$$

where x(n) is the original signal and y(n) is the filtered signal. The characteristics of the filter are decided by the filter coefficients $$a_k k = 1 \ldots N \quad (8)$$

and $$b_l l = 1 \ldots M \quad (9)$$

There are many different choices of the filter coefficients and they are calculated using per se known standard methods. Examples are discrete time Cauer, Butterworth, Chebyshev I or Chebyshev II filters among others. In order to reduce the filter order a Cauer filter may however be prefered compared to Butterworth, an example of considerations to take account of.

Model Estimation

The vibration analysis of the invention is based on a spring model of the tire and on the well known fact that road roughness as well as engine torque excite resonance frequencies in the tire. Using wheel velocity signals from wheel velocity sensors as a starting point, a distinct peak in the energy spectrum dependent on the tire pressure is found for example at the frequency interval 40-50 Hz. An estimated tire pressure is therefore calculated by means of a frequency analysis on wheel velocity signals in a per se known manner.

The tire is modelled as a damped spring, which expressed in a discrete time form is:

$$y_t = -a_1 y_{t-1} - a_2 y_{t-2} + e_t \qquad (10)$$

With the model applied in a tire air pressure system $y_t$ is the actual angular velocity of the wheel and $e_t$ is external noise from the road and the present state of the vehicle. This is a second order auto regression model with a transfer function $$G(q) = \frac{1}{1 + a_1 q^{-1} + a_2 q^{-2}} \qquad (11)$$

where q is an operator such that $q^{-1} y_t = y_{t-1}$. The purpose of the model estimation, i.e. the system identification, is to estimate the model parameters $a_1$ and $a_2$ from which the tire indication can be calculated. There are alternative methods for carrying out the estimation of the parameters, however, it is important that the algorithms are executed on-line, meaning that every sample should be treated immediately rather than as a batch of data collected and processed off-line in order to avoid time delay in the sensor system. According to the invention, the estimation is preferably carried out by means of an adaptive estimation algorithm such as a Recursive Least Squares method (RLS) or a Kalman filtering.

Recursive Least Squares Model Estimation

In an embodiment of the inventive model estimation, the model parameters are estimated by means of a recursive least squares method (RLS). This embodiments comprises the introduction of the parameter vector and regression vector as:

$$\theta = (a_1 a_2)^T$$

$$\varphi_t = (-y_{t-1} - y_{t-2})^T \qquad (12)$$

to simplify the notation. Then the criterion $$V_t(\theta) = \sum_{k=1}^{t} \lambda^{t-k} [y(k) - \varphi^T(k)\theta]^2 \qquad (13)$$

is minimised with respect to $\theta$, by means of the RLS. The solution to (9) is obtained by means of the recursive algorithm:

$$P(t) = \left[ P(t-1) - \frac{P(t-1)\varphi(t)\varphi^T(t)P(t-1)}{\lambda + \varphi^T(t)P(t-1)\varphi(t)} \right] / \lambda \qquad (14)$$

$$K(t) = P(t)\varphi(t)$$

$$\hat{\theta} = \hat{\theta}(t-1) + K(t)\left[ y(t) - \varphi^T(t)\hat{\theta}(t-1) \right].$$

The design variable in RLS is the forgetting factor $\lambda$. A large $\lambda$ (close to 1) makes the algorithm to remember a large number of old measurements and therefore has a low adaptation gain. A small $\lambda$, on the other hand, makes the algorithm faster, but it is instead more sensitive to disturbances. Both parameters $a_1$ and $a_2$ have the same adaptation gain, and only one of them is useful for the tire pressure estimation. Experimental tests have shown that the parameter $a_1$ is strongly correlated with the pressure, while $a_2$ has a poor correlation.

FIG. 18A shows a general flow chart of the inventive model estimation using a Recursive Least Square, comprising the following steps:

1802 establishing or creating a linear regression model;
1804 estimating parameter values by means of a Recursive Least Square process;
1812 transforming parameters to a resonance frequency.

State Space Model Estimation

Another embodiment of the model estimation and parameter estimation is based on Kalman filtering based on a state space model. In the inventive tire air pressure calculation system, the state space model is for example expressed as:

$$x_{t+1} = A x_t + v_t \quad Cov(v_t) = Q_t \qquad (15)$$

$$y_t = C_t x_t + e_t \quad Cov(e_t) = R_t$$

$$x_t = (a_1 \ a_2)^T$$

$$A = I \quad C_t = (-y_{t-1} \ -y_{t-2})$$

$$Q_t = \begin{pmatrix} q_1 & 0 \\ 0 & q_2 \end{pmatrix} \quad R_t = 1$$

The design variable in the Kalman filter is the covariance matrix $Q_t$, which is a description of the relation between $Q_t$ and $R_t$. The Kalman filter allows for different adaption gains ($q_1$ and $q_2$) for the parameters a1 and a2, respectively, which is an important advantage in the model estimation since one of the parameters takes into account the different tire air pressures and the other parameter handles some of the external disturbances.

After the estimation of the parameters values, the parameters are transformed or calculated into a resonance frequency. With the transfer function expressed in equation (11) above, the tire model of equation (10) can be written as:

$$y(q) = G(q)e(q) \qquad (16)$$

$$G(q) = \frac{1}{1 + a_1 q^{-1} + a_2 q^{-2}}.$$

The poles in G(q) is a complex conjugate and the angle $\alpha$ between the poles and the real numbers axis correspond to the resonance frequency. The calculation of the angle $\alpha$ is in an exemplifying embodiment in the tire pressure calculation system implemented with computational advantages as:

$$\alpha = \arctan\left( \frac{\sqrt{-(a_1/2)^2 - a_2}}{(a_1/2)} \right). \qquad (17)$$

Since $\alpha$ is in the range $[0 \ \pi]$ it has to be transformed with respect to the sampling period $T_s$ in order to obtain the resonance frequency $\omega_{res}$, where $$\omega_{res} = \frac{\alpha}{2\pi \cdot T_s} [Hz]. \qquad (18)$$

When the tire air pressure decreases, the dependent parameter $a_1$ decreases and as a consequence also the resonance frequency $\omega_{res}$ decreases.

FIG. 18B shows a general flow chart of the inventive model estimation using a Kalman filter, comprising the following steps:

1808 establishing or creating a state space model;
1810 estimating parameter values by means of a Kalman filtering process;
1812 transforming parameters to a resonance frequency.

Figure 18:
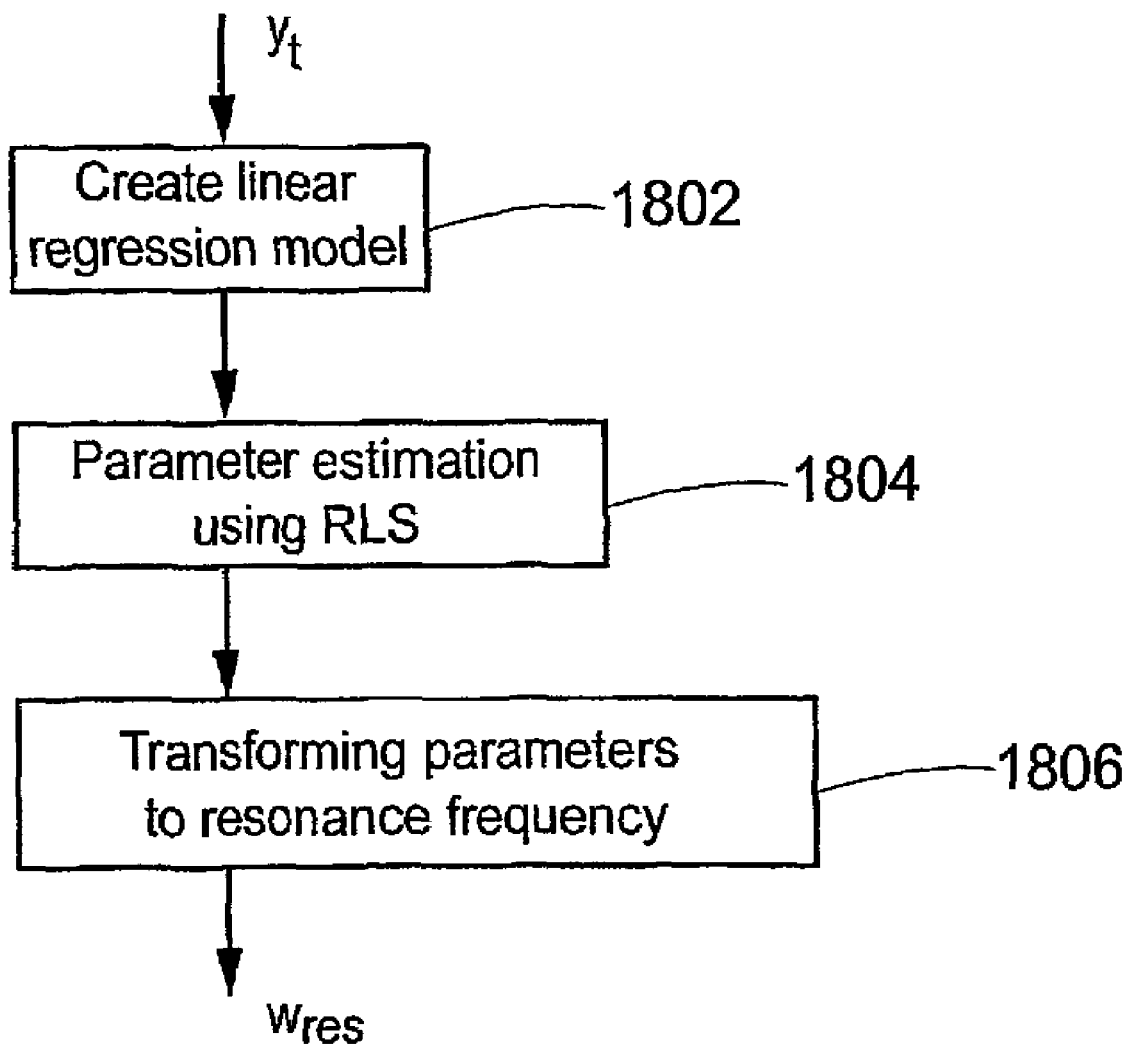
FIG. 18C shows a diagram of resonance frequency estimation using a Kalman filter for three different tire air pressures.
FIGS. 18A and 18B show flow charts of embodiments of the adaptive model estimation.
Figure 18:
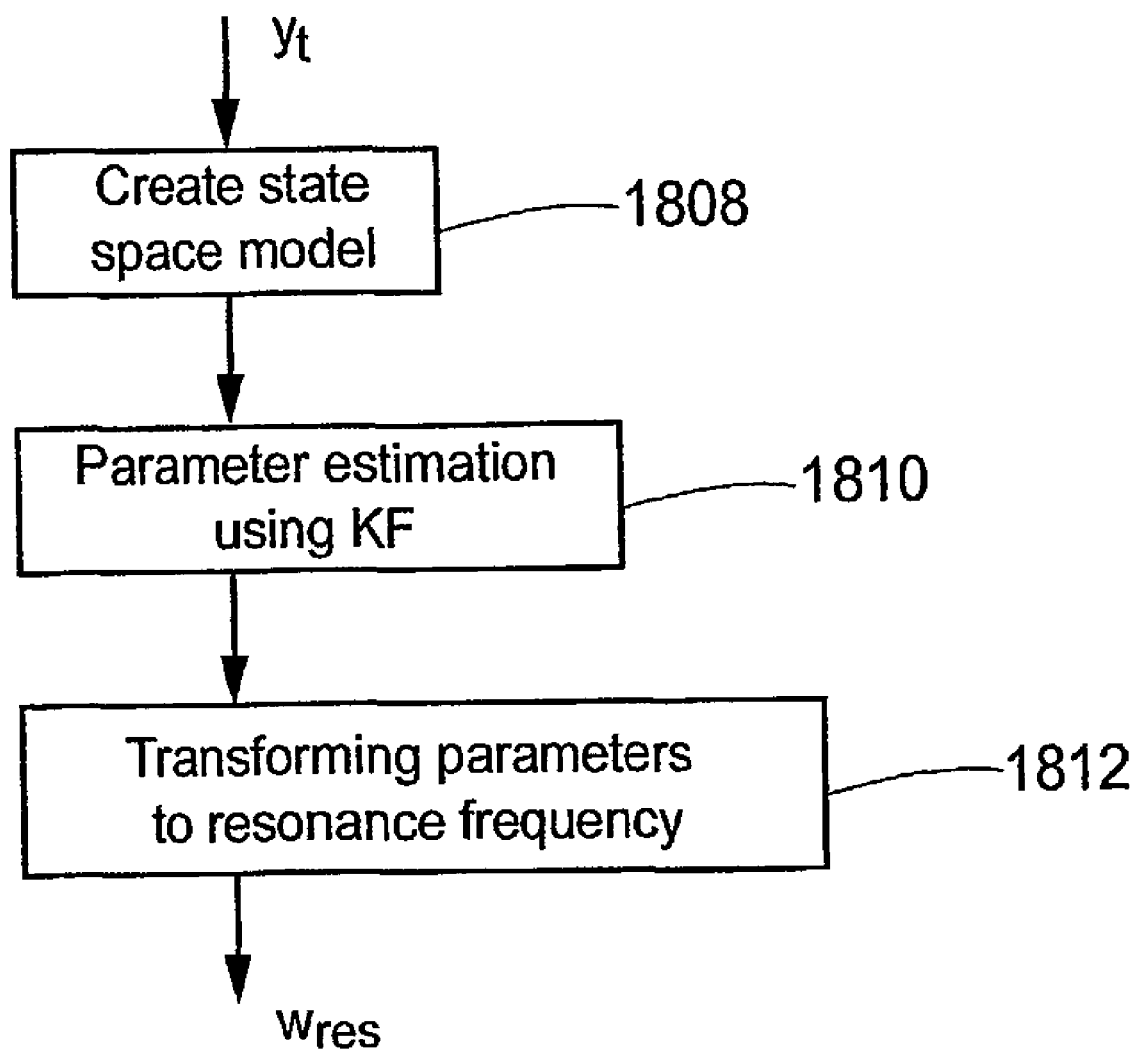
Figure 18:
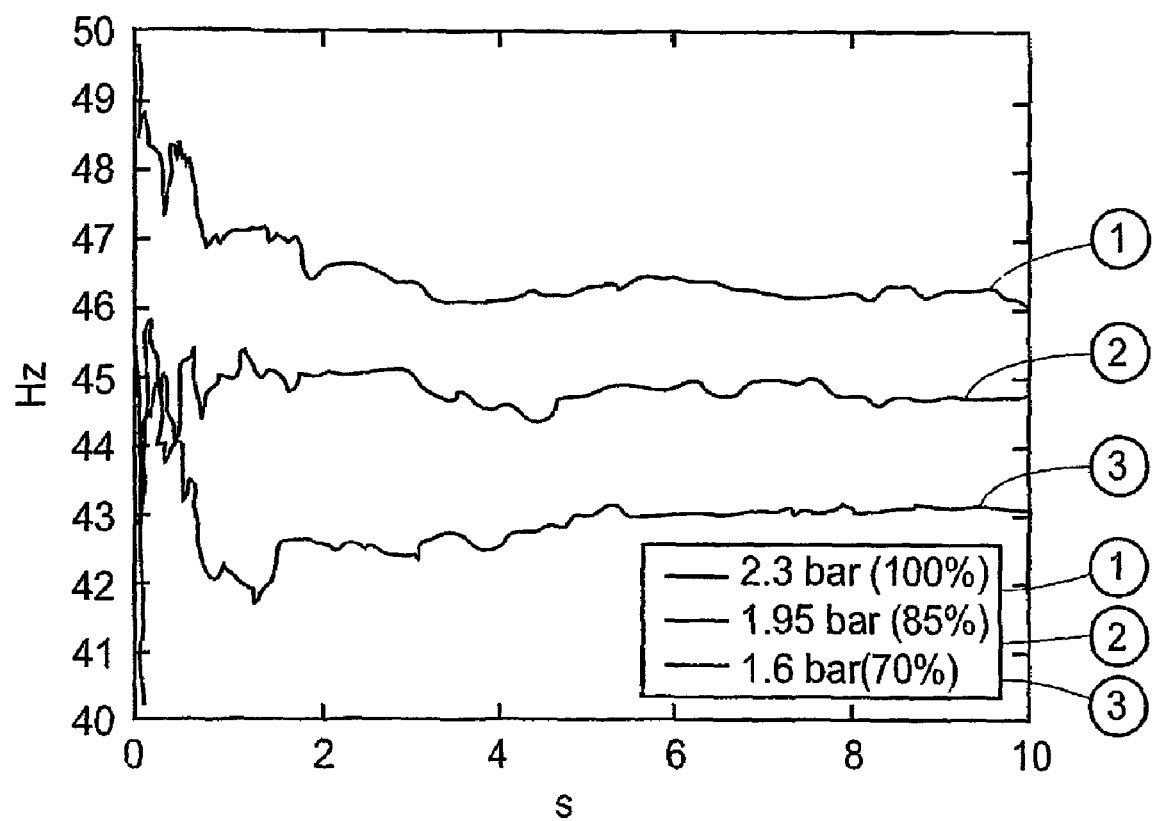

FIG. 18 shows a diagram of the course of the resonance frequency estimation with the Kalman filter for three different tire air pressures, viz curve 1=2, 3 bar, curve 2=1, 95 bar and curve 3=1, 6 bar.

Tire Pressure Indicator Using High Precision Yaw Rate

In one embodiment of the invention an adaptive Tire Pressure Indicator (TPI) is achieved by combining a first tire pressure estimation based on a first physical principle, preferably being a wheel radii analysis on rolling radius phenomena, with an estimation based on a second physical principle, preferably being an analysis on yaw rate phenomena. The wheel radii analysis is preferably computed dependent on signals from wheel angular velocity sensors of an ABS sensor, and the yaw rate analysis is preferably computed dependent on signals from a gyro. In an advantageous variety of this embodiment, signals from a lateral accelerometer is additionally used to enhance the performance of the system.

Figure 19:
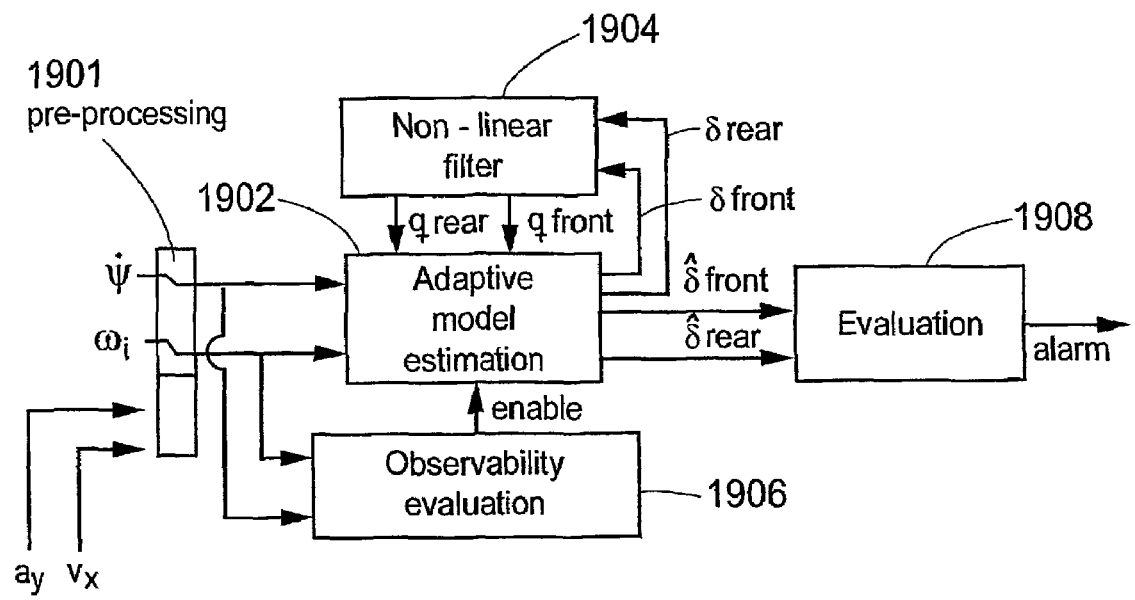
FIG. 19 illustrates an embodiment with an adaptive filter estimation based on a combination of yaw rate analysis and wheel radii analysis.

FIG. 19 shows a flowchart schematically illustrating the functional components as well as the method steps of an embodiment of a tire pressure indicator comprising an adaptive model estimation 1902 receiving as input signals a yaw rate signal $\dot{\psi}$ from a gyro and wheel angular speed signals ωi from an ABS. The model estimation 1902 is preferably realised as an adaptive filter, for example a Kalman filter based on a space state model as described above. The input signals are possibly pre-processed in a pre-processing stage 1901 in order to improve signal quality and usability. The input signals are also received in an observability evaluation stage 1906 devised to determine the observability of the parameters and to transmit an enable signal to the adaptive model estimation stage in case the observability is positively determined. The adaptive model estimation stage 1902 produces as an output offset signals $\delta_{front}$ and $\delta_{rear}$, respectively, and $\delta_{front\ hat}$ and $\delta_{rear\ hat}$, respectively. The offset signals $\delta_{front}$ and $\delta_{rear}$ are input into a non-linear filter 1904 which in a feedback connection transmits its output $q_{front}$ and $q_{rear}$ back to the adaptive model estimation stage 1902 in order to speed up the adaptation after a pressure drop. The q-parameters describe the speed of the adaption for the two offset values and is normally small (slow). However, if a pressure drop would occur the adaptation speed is increased in order to enable tracking of the new situation. The values of signals representing $\delta_{front\ hat}$ and $\delta_{rear\ hat}$ are transmitted to an evaluation stage 1908 devised to evaluate tire pressure changes and to generate change indicator signals, for example in the shape of an alarm in accordance with predetermined rules.

Figure 20:
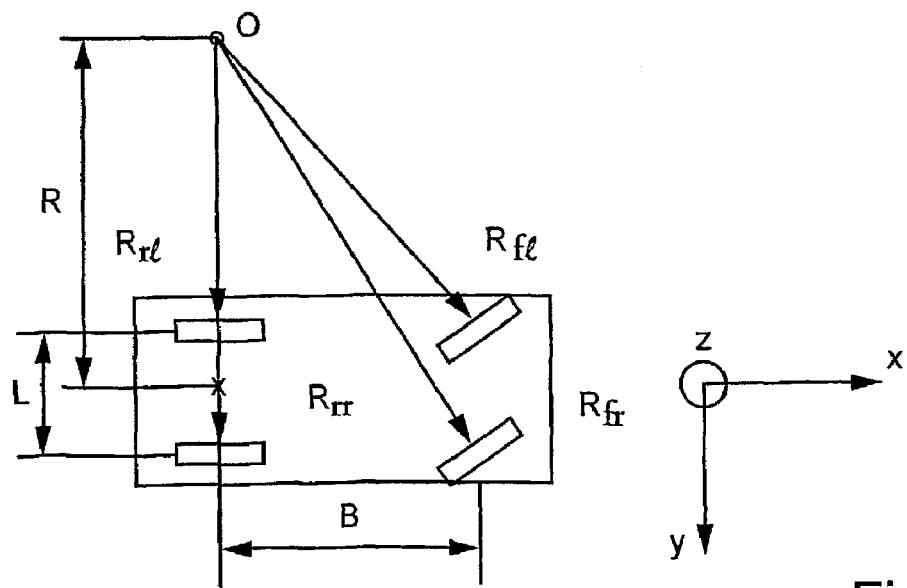
FIG. 20 shows the geometrical relations in four wheeled vehicle.

FIG. 20 shows a schematic drawing of a four-wheeled vehicle during cornering, in which drawing the geometric relations are defined for the wheel velocities used to compute a yaw rate estimation from wheel speed signals. The wheels are in this application denoted rl for rear left, rr for rear right, fl for front left and fr for front right. A coordinate system indicating the x, y, and z-directions is also drawn in FIG. 20.

In the adaptive model estimation 1902 a high precision yaw rate value is calculated by means of a first yaw rate signal from the gyro combined with a second yaw rate value calculated dependent on wheel angular speed signals. The following equations are used in this process.

$$\dot{\psi} = \frac{v_x}{R} = v_x R^{-1} \tag{19}$$

$$a_y = \frac{v_x^2}{R} = v_x^2 R^{-1} = v_x \dot{\psi}$$

wherein $\dot{\psi}$ is the yaw rate from a gyro;
$v_x$ is the velocity of the vehicle in the x-direction taken from an ABS system; and
$a_y$ is the acceleration in the y-direction optionally taken from a lateral accelerometer, and input into the adaptive model estimation.

The curve radius is defined as the distance between the rotational centre of the car and the middle of the rear axis, and is computed according to the following relation, where R is defined as the distance to the center of the rear wheel axle, $$\frac{v_{rr}}{v_{rl}} = \frac{R_{rr}}{R_{rl}} = \frac{R + L/2}{R - L/2} \tag{20}$$

The angular wheel velocities ω for each of the respective wheels are received from an ABS and the inverse $R^{-1}$ of R is solved in order to avoid numerical problems in certain driving cases, e.g. driving straight ahead. This results in $$R^{-1} = \frac{2}{L} \frac{\frac{v_{rl}}{v_{rr}} - 1}{\frac{v_{rl}}{v_{rr}} + 1} = \frac{2}{L} \frac{\frac{\omega_{rl} r_{rl}}{\omega_{rr} r_{rr}} - 1}{\frac{\omega_{rl} r_{rl}}{\omega_{rr} r_{rr}} + 1} \tag{21}$$

where the wheel radius is denoted $r_i$.

The wheel radii ratio is subject to an offset:

$$\frac{r_{rl}}{r_{rr}} \equiv 1 + \delta_{rear} \tag{22}$$

The influence of the offset on the denominator is negligible, so in preferred embodiments the following expression is used for inverse curve radius:

$$R^{-1} = \frac{1}{L} \frac{2}{\frac{\omega_{rl}}{\omega_{rr}} + 1} \left( \frac{\omega_{rl}}{\omega_{rr}} (1 + \delta_{rear}) - 1 \right) = R_m^{-1} + \frac{1}{L} \frac{2}{\frac{\omega_{rl}}{\omega_{rr}} + 1} \delta_{rear} \tag{23}$$

wherein the computable quantity $$R_m^{-1} = \frac{1}{L} \frac{2}{\frac{\omega_{rl}}{\omega_{rr}} + 1} \left( \frac{\omega_{rl}}{\omega_{rr}} - 1 \right) \tag{24}$$

is used for the inverse curve radius.

The velocity at the centre of the rear wheel axle is $$v_{x,m} = \frac{\omega_{rl} + \omega_{rr}}{2} r \quad (25)$$

where r denotes the nominal wheel radius.

Finally the yaw rate is computed with $$\dot{\psi} = v_{x,m} R_m^{-1} \quad (26)$$

In a practical implementation of this embodiment, the sensor measurements are typically as follows:

$y_1(t)$ is from a yaw rate sensor, i.e. gyro signal;
$y_2(t) = v_{x,m,rear} R_{m,rear}^{-1}$, from rear ABS sensors;
$R_{m,rear}^{-1}$ is computed as $R_m^{-1}$ above;
$v_{x,m,rear}$ as $v_{x,m}$;
$y_3(t) = v_{x,m,front} R_m^{-1}$, from front ABS sensors; and
$R_{m,front}^{-1}$ and $v_{x,m,front}$ are computed in the same way as $R_m^{-1}$ and $v_{x,m}$, where $\omega_{rl}$ is replaced with $\omega_{fl}$ and $\omega_{rr}$ is replaced with $\omega_{fr}$.

All these sensor measurements are subject to an offset and measurement noise given by the relations:

$$y_1(t) = \dot{\psi}(t) + \delta_{gyro}(t) + e_1(t) \quad (27)$$

$$y_2(t) = v_{x,m,rear}(t) R_{m,rear}^{-1}(t) + e_2(t)$$

$$= \dot{\psi}(t) + v_{x,m,rear}(t) \frac{1}{L} \frac{2}{\frac{\omega_{rl}(t)}{\omega_{rr}(t)} + 1} \frac{\omega_{rl}(t)}{\omega_{rr}(t)} \delta_{rear}(t) + e_2(t)$$

$$y_3(t) = v_{x,m,front}(t) R_{m,front}^{-1}(t) + e_2(t)$$

$$= \dot{\psi}(t) + v_{x,m,front}(t) \frac{1}{L} \frac{2}{\frac{\omega_{fl}(t)}{\omega_{fr}(t)} + 1} \frac{\omega_{fl}(t)}{\omega_{fr}(t)} \delta_{front}(t) + e_3(t)$$

where $\delta_{rear}$ is an offset that depends on the relative tire radius between rear left and right wheels and $\delta_{front}$ on the relative radius between the left and right front wheels. $\delta_{front}$ is defined in the same way as $\delta_{rear}$.

In accordance with the invention, the offsets are estimated adaptively by recursive least squares (RLS) algorithm, least mean square (LMS) or a Kalman filter. The Kalman filter is preferred and has the advantages over RLS in the following way:

Firstly, a model for the variation of the true yaw rate can be incorporated in the Kalman filter.

Secondly, different time-variations of the sensor offsets can be used. For instance, temperature can influence the gyro offset variation, a cold start can male the filter forget more of the gyro offset than the ABS offset The Kalman filter is completely specified by a state space equation of the form $$x(t+1) = Ax(t) + Bv(t)$$

$$y(t) = Cx(t) + e(t) \quad (28)$$

where the covariance matrices of v(t) and e(t) are denoted Q and R, respectively.

The problem when designing an implementation is to set up the state space model. An exemplifying embodiment uses the state vector:

$$x(t) = \begin{pmatrix} \dot{\psi}(t) \\ \ddot{\psi}(t) \\ \delta_{gyro} \\ \delta_{rear} \\ \delta_{front} \end{pmatrix} \quad (29)$$

and a continuous time state space model is:

$$\dot{x}(t) = \begin{pmatrix} 0 & 1 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \end{pmatrix} x(t) + \begin{pmatrix} 0 \\ 1 \\ 0 \\ 0 \\ 0 \end{pmatrix} v(t) \quad (30)$$

$$y(t) =$$

$$\begin{pmatrix} 1 & 0 & 1 & 0 & 0 \\ 1 & 0 & 0 & v_{x,m,rear}\frac{1}{L}\frac{2}{\frac{\omega_{rl}}{\omega_{rr}}+1}\frac{\omega_{rl}}{\omega_{rr}} & 0 \\ 1 & 0 & 0 & 0 & v_{x,m,front}\frac{1}{L}\frac{2}{\frac{\omega_{fl}}{\omega_{fr}}+1}\frac{\omega_{fl}}{\omega_{fr}} \end{pmatrix} x(t) +$$

$$e(t)$$

It is here assumed that there is an unknown input v(t) that affects the yaw acceleration, which is a common model for motion models, basically motivated by Newton's law F=ma.

A discrete time state space model is described in the following equation (31) and is used by the Kalman Filter.

$$x(t+1) = \begin{pmatrix} 1 & T_s & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{pmatrix} x(t) + \begin{pmatrix} T_s^2/2 \\ T_s \\ 0 \\ 0 \\ 0 \end{pmatrix} \begin{pmatrix} T_s^2/2 \\ T_s \\ 0 \\ 0 \\ 0 \end{pmatrix} v(t) \quad (31)$$

$$y(t) =$$

$$\begin{pmatrix} 1 & 0 & 1 & 0 & 0 \\ 1 & 0 & 0 & v_{x,m,rear}\frac{1}{L}\frac{2}{\frac{\omega_{rl}}{\omega_{rr}}+1}\frac{\omega_{rl}}{\omega_{rr}} & 0 \\ 1 & 0 & 0 & 0 & v_{x,m,front}\frac{1}{L}\frac{2}{\frac{\omega_{fl}}{\omega_{fr}}+1}\frac{\omega_{fl}}{\omega_{fr}} \end{pmatrix} x(t) +$$

$$e(t)$$

The relative wheel radii offsets do not vary during normal driving with correct pressure and therefore the adaptation gains for the wheel radii offsets are low. To speed up the adaptation after a pressure drop in the rear wheels a non-linear filter is applied, in accordance with:

$$g(t)_{rear} = g(t)_{rear} + s(t)_{rear} v$$

$$g(t)_{rear} = 0 \text{ if } g(t)_{rear} < 0$$

if $g(t)_{rear} > h$, alarm and increase $q_{rear}$ one sampel $$g(t)_{rear} = 0 \quad (32)$$

Where $$s(t)_{rear} = y_2(t) - \left( x_1(t) + v_x \frac{1}{L} \frac{2}{\frac{\omega_{rl}}{\omega_{rr}} + 1} \frac{\omega_{rl}}{\omega_{rr}} x_4(t) \right).$$

In the same way a non-linear filter can be applied for a pressure drop in the front wheels.

The system monitors $\delta_{rear}$ and $\delta_{front}$ if the any of these values exceeds a threshold h an alarm is provided. The following predetermined rules are used to decide which tire pressures that are incorrect.

| Event | Alarm |
|---|---|
| $\delta_{rear} > h$ | Pressure drop in rear right wheel |
| $\delta_{rear} < -h$ | Pressure drop in rear left wheel |
| $\delta_{front} > h$ | Pressure drop in front right wheel |
| $\delta_{front} < -h$ | Pressure drop in front left wheel |

Figure 21:
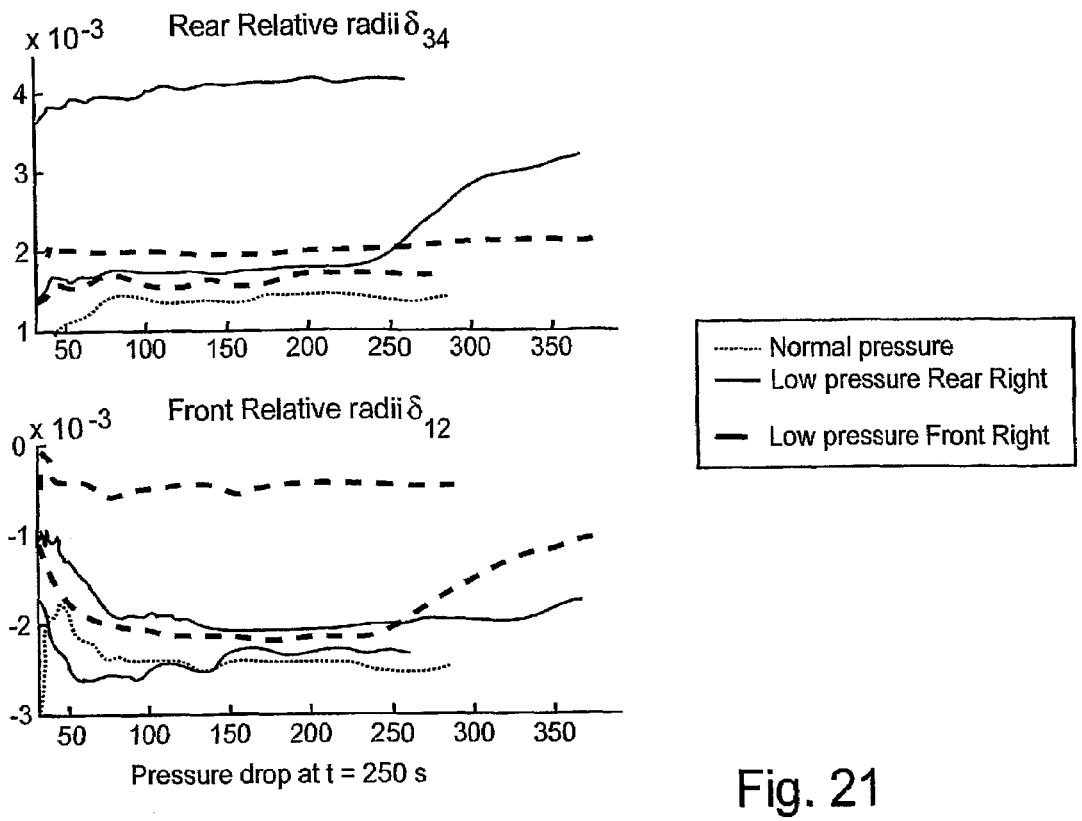
FIGS. 21 and 22 show diagrams of resulting tire pressure estimations with and without a non-linear filter for speeding up adaptation.
Figure 22:
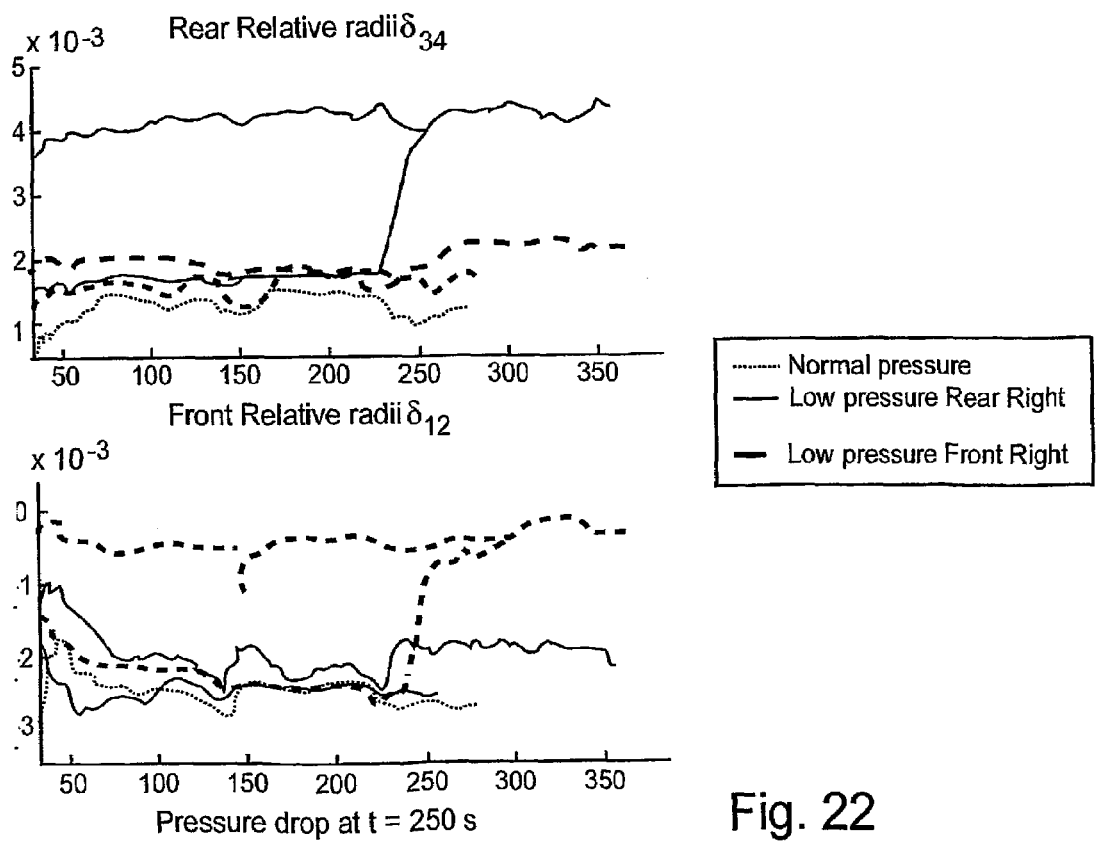

FIG. 21 shows a plotted curve of the results of the tire pressure estimation without a non-linear filter, and FIG. 22 shows the results with a non-linear filter for speeding up the adaptation gain.

In a stepwise description of this embodiment for tire pressure indicator, the inventive method comprises the following steps (referring again to FIG. 19).
1) Collecting measurements:
   (a) yaw rate signals from a yaw rate gyro;
   (b) angular wheel speed signals from an ABS Sensors;
   (c) possibly lateral acceleration signal ay from a lateral accelerometer;
   (d) possibly wheel steering angle from a wheel steering angle sensor;

input to a pre-processing stage 1901 or into an adaptive model estimation step 1902.
2) Pre-processing and filtering of raw sensor data, comprising:
   (a) Scaling of sensor inputs to physical constants.
   (b) Low-pass filtering of yaw rate to reduce quantization and noise error effects for instance averaging over a few samples.
   (c) Rotational synchronisation of cog stamps to avoid cog deformity error effects i.e. calculate wheel angular velocity by using a fall revolution of the wheel.
   (d) Similar treatment of sensor signals 1c) and 1d) to reduce known error effects for instance low-pass filtering.
   (e) Performing simple diagnosis on sensors to tale care of sensor built-in diagnosis functions for instance sensors using a zero level voltage to indicate internal failure.
3) Calculating filter inputs and parameters in error model, comprising:
   (a) Calculating the inverse curve radii estimate from front axle wheelage (equation 24, with wheel index changed to $\omega_{fl}$ and $\omega_{fr}$.)
   (b) Calculating the inverse curve radii estimate from rear axle wheelage (equation 24).
   (c) Calculating the vehicle velocity estimate from ABS sensors (equation 25).
   (d) Calculating the yaw rate estimate from front and rear wheelage (equation 26).
   (e) Calculating the wheel radii offset error propagation function for rear axle.
   (f) Calculating the wheel radii offset error propagation function for front axle.
(4) Examining data quality by given norms to produce statistical matrices for Kalman Filtering, for instance:
   (a) Low velocity increases noise and other errors in yaw rate from ABS sensors estimated=>increasing the covariance matrix R.
   (b) Standstill car assures yaw rate to be exactly zero=>decreasing the covariance matrix R.
(5) Applying the Kalman Filter equations.
(6) Detecting changes using a non-linear filter.
(7) Output adaptive filter
   (a) Providing relative wheel radii $\delta_{ABS}$ between left and right wheels on rear and front wheelage to be used for a tire pressure indicator systems.

If $|\delta_{ABS}| > h$ exceeds the threshold h a pressure drop alarm is provided.

Tire Pressure Indicator Using High Precision Yaw Rate and Road Friction Indicator In one embodiment the tire pressure indication is achieved by combining parameters based on lateral vehicle dynamics with parameters based on parameters dependent on road friction in an integrated tire pressure model. Preferably, the lateral dynamics parameters are derived from a high precision yaw rate computation as described above and the road friction parameters is derived from a torque signal indicating the torque of the vehicle motor together with a gearing ratio indication signal. The integrated tire pressure model is in accordance with the invention realised in an adaptive filter or adaptive estimation algorithm such as a Recursive Least Squares Method or a Kalman filter, as described above.

Using the geometric vehicle relations as described in connection with FIG. 20, a method for calculating the road friction dependent on angular wheel speed is described in the following equations.

| Symbol | Description |
|---|---|
| $\omega_d$ | Angular velocity, driven wheel [rad/s] |
| $\omega_n$ | Angular velocity, non-driven wheel [rad/s] |
| $r_d$ | Wheel radius, driven wheel [m] |
| $r_n$ | Wheel radius, non-driven wheel [m] |
| $T_e$ | Engine torque [Nm] |
| i | Gearing ratio from engine to driven wheels [-] |
| N | Normal force at driven wheel [N] |
| s | Wheel slip [-] |
| $\mu$ | Normalized traction force [-] |

The longitudinal stiffness k, which during normal driving conditions can be modeled as $$k = \frac{\mu}{s}, \tag{33}$$

where $$\mu = \frac{T_e i}{2 r_d N}$$

is the normalized traction force and $$s = \frac{\omega_d r_d - \omega_n r_n}{\omega_n r_n} = \frac{\omega_d r_d}{\omega_n r_n} - 1 \quad (34)$$

is the wheel slip. Here N is the tire normal force that depends on the mass, the vehicle geometry and the vehicle state (such as the current velocity and acceleration/retardation).

In practice one must take into account that the wheel radii $r_d$ and $r_n$ are unknown. By introducing $\delta$ as the relative difference in wheel radii, i.e., $$\delta = \frac{r_n - r_d}{r_n} = 1 - \frac{r_d}{r_n}, \quad (35)$$

and approximating the wheel slip as $$s_m = \frac{\omega_d}{\omega_n} - 1, \quad (36)$$

one obtains the model $$s_m \approx s + \delta = \frac{1}{k}\mu + \delta. \quad (37)$$

The parameters in this model, $1/k$ and $\delta$, can be estimated from measured slip $s_m$ and traction force $\mu$ using an adaptive filter (such as a recursive least squares algorithm or a Kalman filter) and the state space model $$x_{t+1} = x_t + w_t,$$

$$s_{m,t} = H_t x_t + e_t, \quad (38)$$

where $x_t = (1/k\ \delta)^T$, $H_t = (\mu_t\ 1)^T$, and $w_t$ and $e_t$ are process and measurement noise, respectively.

This method is in one embodiment used separately for the left and the right side of the vehicle. This yields two relative radii offsets $$\delta_{left} = 1 - \frac{r_{fl}}{r_{rl}} \quad (39)$$

$$\delta_{right} = 1 - \frac{r_{fr}}{r_{rr}}$$

assuming a front wheel driven car. In case of a rear driven car the fractions on the right hand side need two be inverted. The relative wheel radii offsets do not vary during normal driving with correct pressure and therefore the adaptation gains ($q_{left}$ and $q_{right}$) for the wheel radii offsets are low. To speed up the adaptation after a pressure drop in the rear wheels a non-linear filter is applied.

$$g(t)_{left} = g(t)_{left} + s(t)_{left} - \upsilon$$

$$g(t)_{left} = 0 \text{ if } g(t)_{left} < 0$$

if $g(t)_{left} > h$, alarm and increase $q_{left}$ one sampel $$g(t)_{left} = 0 \quad (40)$$

where $s(t)_{left} = y_{left} - (\mu_{t,left} x(t)_1 + x(t)_2)$. In the same way the non-linear filter can be applied for the right side. The system monitors $\delta_{left}$ and $\delta_{right}$ if the any of these values exceeds a threshold h an alarm is provided. The following logistics are used to decide which tire pressures that are incorrect.

| Event | Alarm |
|---|---|
| $\delta_{left} > h$ | Pressure drop in front left wheel |
| $\delta_{left} < -h$ | Pressure drop in rear left wheel |
| $\delta_{right} > h$ | Pressure drop in front right wheel |
| $\delta_{right} < -h$ | Pressure drop in rear right wheel |

Figure 23:
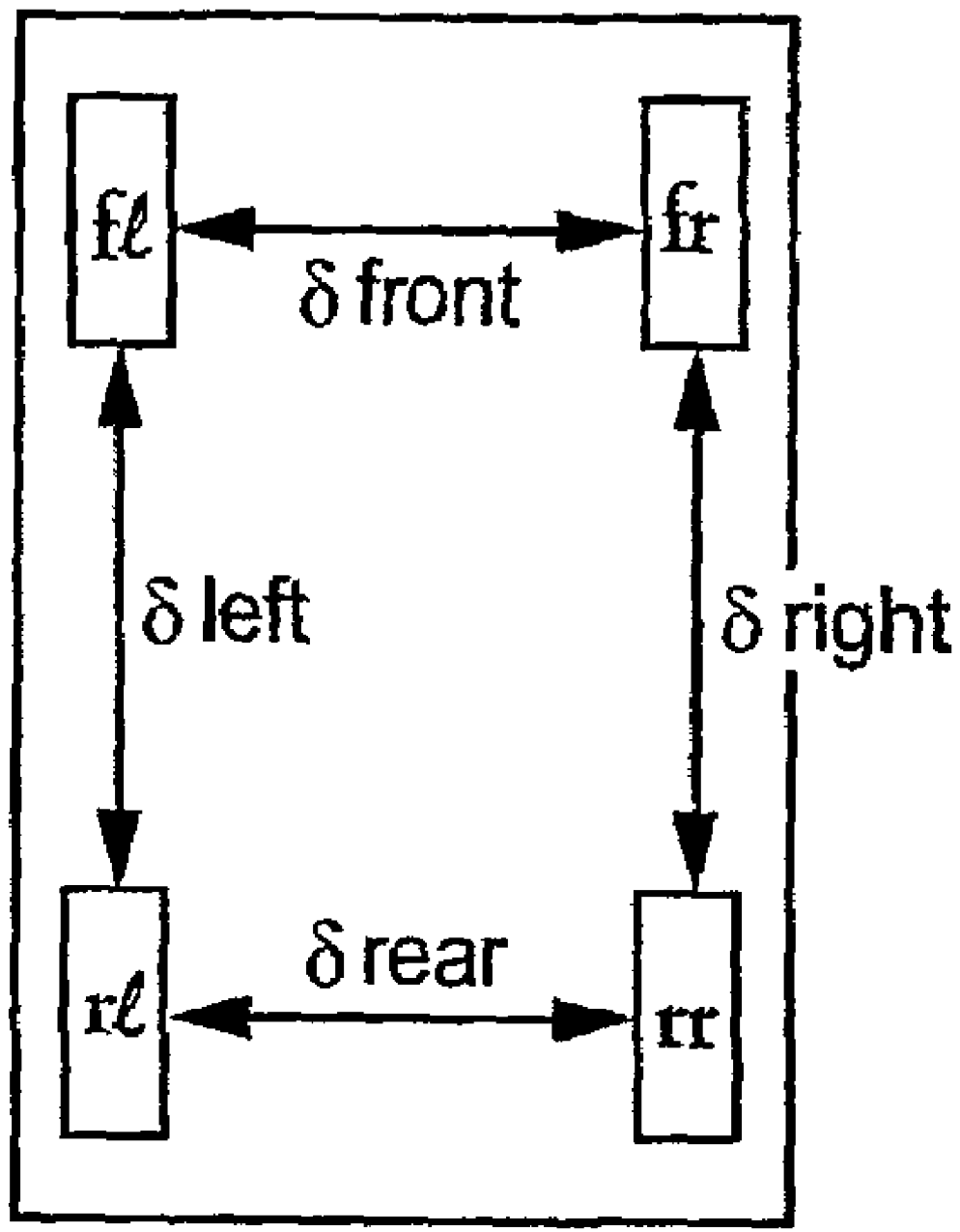
FIG. 23 shows the relations between offset values.
Figure 24:
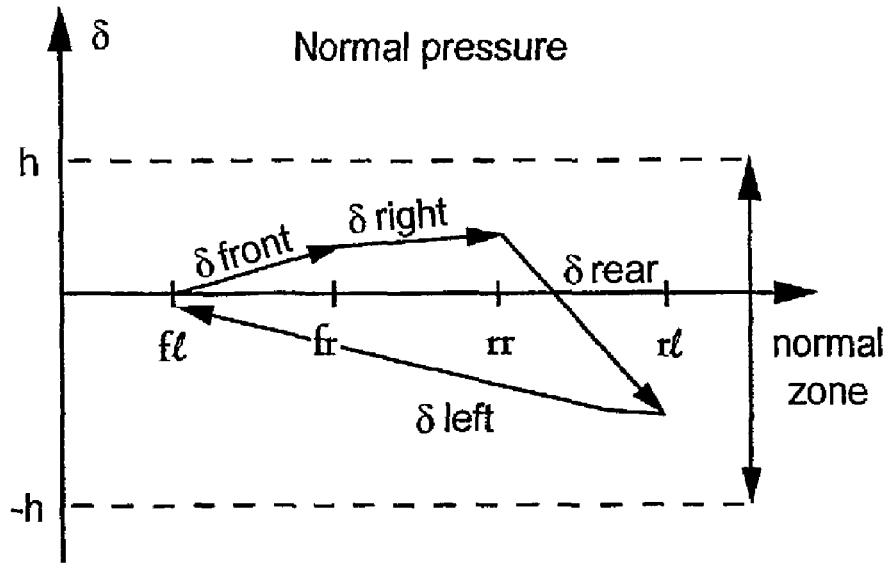
FIGS. 24 and 25 show vector diagrams for detecting a low pressure tire.
Figure 25:
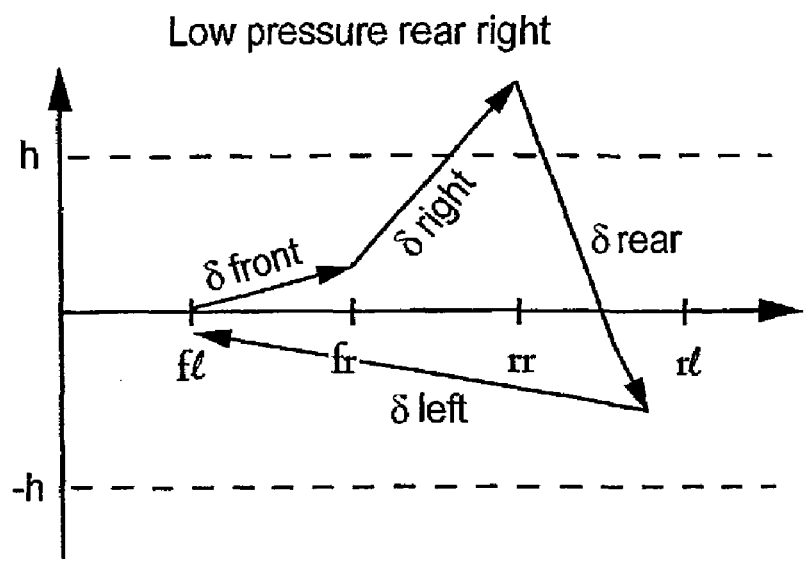

FIG. 23 shows how the relative wheel radius offsets from high precision yaw rate computation and road friction computation are related. FIGS. 24 and 25 show how these offsets can be used to find out if a wheel has a low tire pressure, in relation to the other wheels, and also to identify which wheel that deviates in tire pressure from the other ones. More specifically FIG. 24 shows an illustration of how offset vectors in a normal tire pressure situation sum up to zero, but for a small estimation error due to the fact that the tires are not absolutely similar. FIG. 25 shows a situation where the rear right tire has a low pressure and $\delta_{right}$ and $\delta_{rear}$ are significantly larger than the estimation error.

Figure 26:
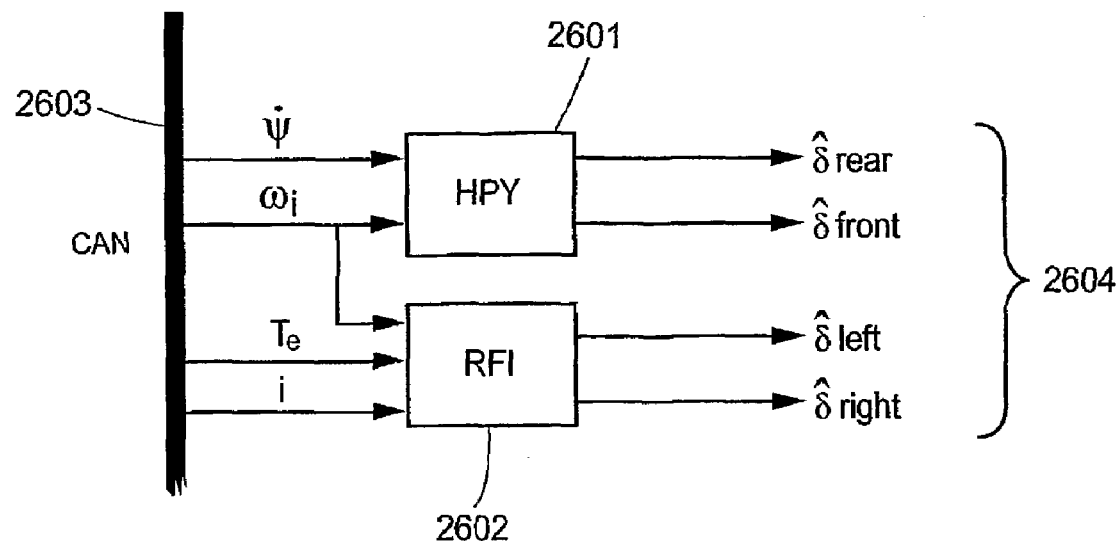
FIGS. 26 and 27 show embodiments for high precision yaw rate and road friction based tire pressure estimation.

FIG. 26 shows schematically the offset computation from CAN signals 2603 inputting yaw rate and angular wheel velocity to a high precision yaw rate computation stage 2601, and torque and gear indication to a road friction indication computation stage 2602. The output offset values 2604 from the two computation stages are $\delta_{left}$ and $\delta_{right}$.

Figure 27:
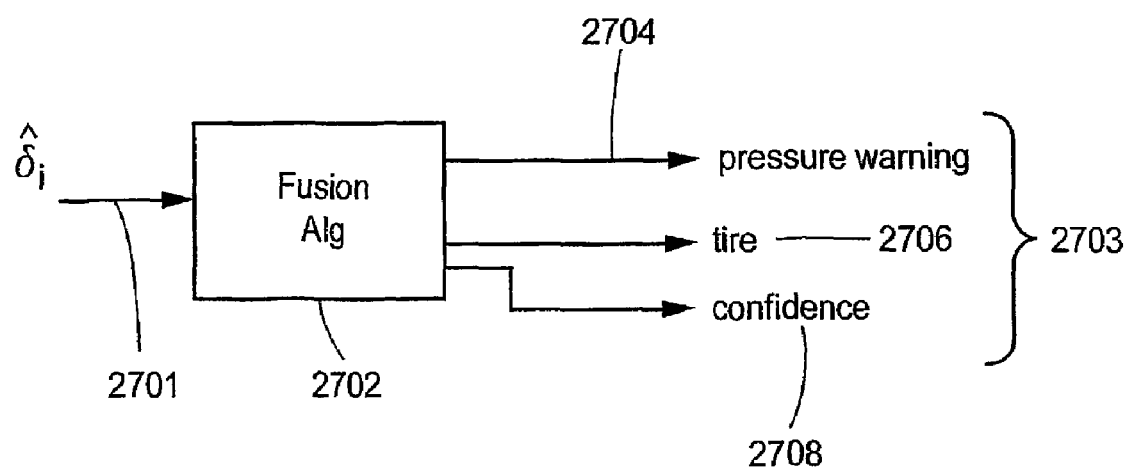

FIG. 27 shows schematically the offset values 2604, 2701 being input into an integrated tire pressure model as mentioned above comprising parameters representing the respective offset values relating to lateral vehicle dynamics and road friction. In an integrated tire pressure model for example realised by means of a Kalman filter, the output 2703 may be adjusted to indicate a pressure warning 2704, a tire indication or identification 2706 and a confidence indication 2708.

Tire Pressure Estimation for Motorcycles

One application of the invention is directed to tire pressure estimation in motorcycles. In different embodiments of the invention different sets of parameters and input sensor signals are combined or integrated in the tire pressure estimation model. FIG. 28 shows the geometric relations for normal and lateral forces on a motorcycle expressed in well established notational terms, and FIG. 29 shows in the same manner the notation for angular velocities.

In the motorcycle embodiment of the invention the angular velocity of the front and the rear wheel, for example detected by sensors in an ABS equipment, are input to a predetermined tire pressure estimation model, possibly in conjunction with additional sensor signals for improving the estimate. An additional parameter used in advantageous embodiments is the roll angle as detected by a roll angle sensor. The roll angle is in a simpler embodiment used as a threshold to turn off indications from the tire pressure estimation system when the roll angle is outside a permitted interval. In another embodiment the roll angle is comprised and integrated in the model in order to increase the roll angle interval in which the tire pressure estimation is useful.

Figure 30:
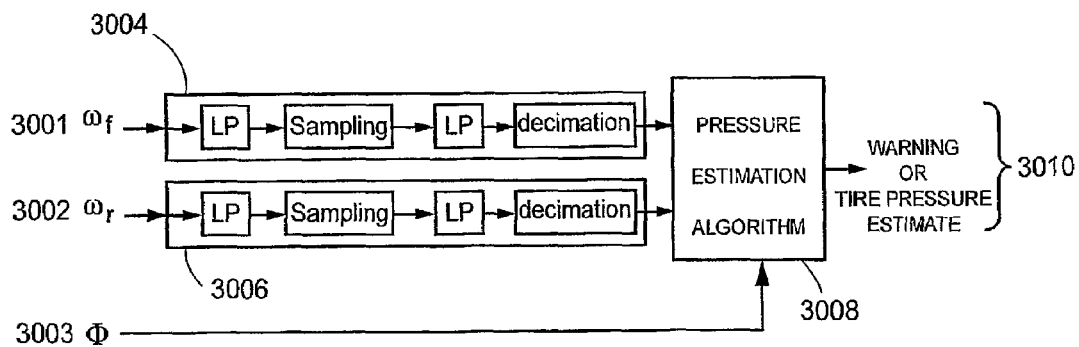

FIG. 30 shows schematically an embodiment of the invention talking as an input angular velocity signals for the front wheel 3001 and for rear wheel 3002 respectively, and the roll angle 3003 to a tire pressure estimation stage 3008 comprising an adaptive model as described above in this description text. The angular velocity signals are before their input into the estimation stage pre-processed in a pre-processing stage 3006 preferably comprising a combination of a first and a second low pass filter, a resampling and a data decimation stage as described in the pre-processing section of this text.

Figure 31:
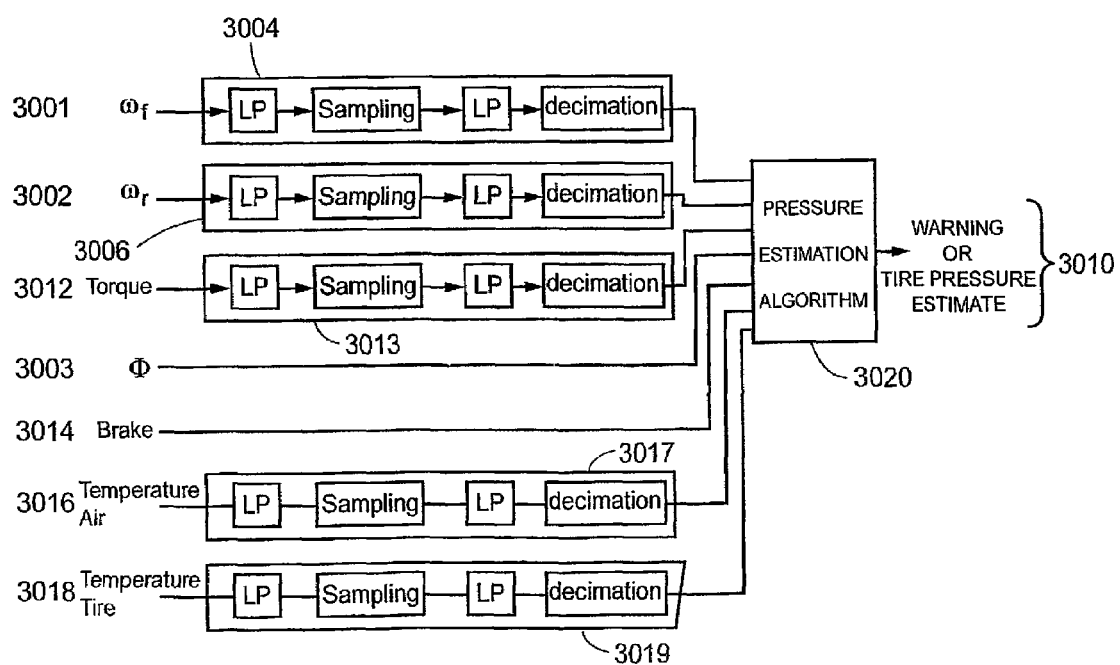

In a more advanced embodiment, schematically shown in FIG. 31, further single or combined signals from sensors detecting parameters such as torque 3012, brake 3014, air temperature 3016 and tire temperature 3018 information are comprised in an integrated tire estimation model 3020 to improve the system further. Similar to the previous embodiment, the additional sensor signals may be processed in a specifically adapted pre-processing stage 3013, 3017, 3019 in order to improve signal quality. In addition to the above equations, the model adapted for motorcycles takes into account the following basic equations for detecting changes in effective wheel radius between the front and the rear wheel. The wheel slip for the rear wheel is:

$$s = \frac{\omega_r r_r - u_r}{u_r} = \quad (41)$$

$$\frac{\omega_r r_r - \omega_f r_f}{\omega_f r_f} = \frac{\omega_r r_r}{\omega_f r_f} - 1 = \left\{\delta_r = \frac{r_r}{r_f}\right\} = \frac{\omega_r}{\omega_f}\delta_r - 1$$

If no torque is applied to any of the wheels, the slip are equal to zero which gives $$s|_{\tau_r=\tau_f=0} = \frac{\omega_r}{\omega_f}\delta_r - 1\Big|_{\tau_r=\tau_f=0} = 0 \Rightarrow \delta_r|_{\tau_r=\tau_f=0} = \frac{\omega_f}{\omega_r} \quad (42)$$

The performance is improved by removing outliers, which typically are connected to different types of driving such as acceleration, turning and braking. The parameter $\delta_r$ is preferably estimated using a recursive filter such as recursive least square (RLS) or Kalman filter.

Figure 32:
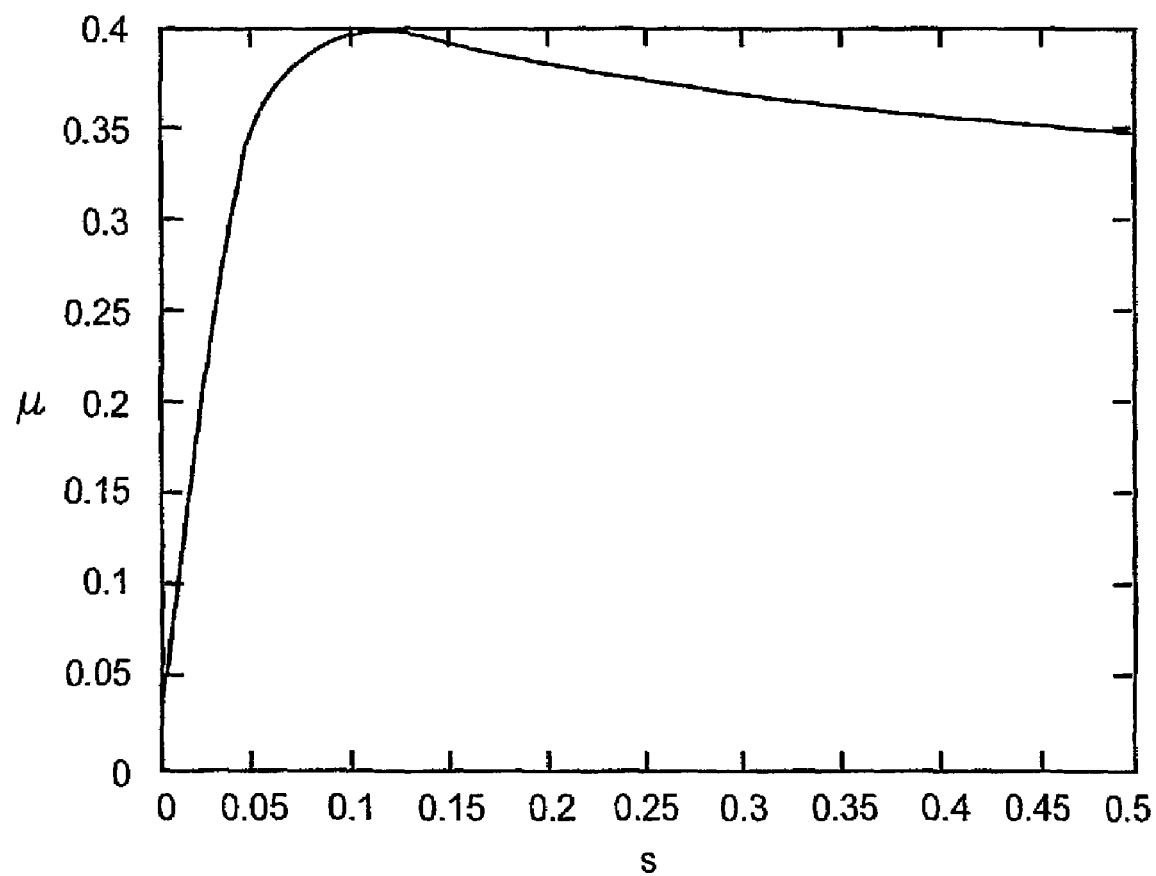

An improved embodiment comprises an algorithm integrating torque information in the following manner. A measurement of the applied torque is used to calculate the applied force between the wheel and the ground. When the normal forces on the wheels are known, the normalised traction force $$\mu = \frac{F}{N}$$

is estimated. The relation between slip and normalised traction force is illustrated in the diagram of FIG. 32. Preferably the system is designed for small slip values and thence the curve can be and is in one embodiment made linear according to $$k = \frac{d\mu}{ds}\Big|_{\mu=0} \quad (43)$$

Because the true velocity of the rear wheel is approximated by the angular velocity multiplied with the wheel radius of the front wheel this curve has a significant offset $$\delta = s|_{\mu=0} \quad (44)$$

The linear model for the slip slope is then modelled as $\mu=k(s-\delta)$. In order to estimate the parameters k and δ, a good regression model required, preferably $$s_{measured}(t) = \quad (45)$$

$$\mu(t)\frac{1}{k} + \delta + e(t) = (\mu(t)1)\begin{pmatrix} 1/k \\ \delta \end{pmatrix} + e(t) = H(t)x + e(t)$$

A state space model for an adaptive filter such as a Kalman filter is expressed as:

$$x(t+T)=x(t)+v(t)$$

$$y(t)=H(t)x(t)+e(t) \quad (46)$$

where $$Q(t)=Ev(t)v^T(t)$$

$$R(t)=Ee(t)e^T(t)$$

$$y(t)=s_{measured}$$

$$H(t)=(\mu(t)1)$$

$$x(t)=(1/k(t)\delta(t))^T \quad (47)$$

In order to calculate the normalised traction force, the normal forces acting on the motorcycle are estimated. Derivation of these forces are straightforward, especially if the system takes account of the roll angle by being turned off when leaning in turns, as in the first alternative mention above. The alternative method is to extend and integrate the roll angle in the model to make it able to handle leaning of the motorbike. An embodiment realising the latter alternative will have to handle the lateral forces acting on the wheels, which in their turn influences the longitudinal stiffness. In accordance with embodiments of the invention employing a Kalman filter, this is efficiently dealt with in a properly tuned Kalman filter since the longitudinal stiffness can change very fast e.g. due to different types of roads snow, ice etc, but the wheel radius offset is changing slowly.

In order to compensate for normal and lateral forces in turns models for the forces acting on the wheels are derived in accordance with the following equations, for the notation referring to FIGS. 28 and 29.

Force acting on front wheel normal to the road is expressed as:

$$N_f = \frac{l_r}{l_r+l_f}mg - \frac{\cos\Phi}{l_r+l_f}(\dot{u}z_G + l_r u\theta) \quad (48)$$

Force acting on rear wheel normal to the road is expressed as:

$$N_r = \frac{l_f}{l_r + l_f}\mathrm{mg} + \frac{\cos\Phi}{l_r + l_f}(\dot{u}z_G - l_f u\dot\theta) \qquad (49)$$

Force acting on the rear wheel in the road perpendicular to the direction of travel is expressed as:

$$F_{ry} = \frac{m\sin\Phi}{l_r + l_f}(\dot{u}z_G + l_r u\dot\theta) \qquad (50)$$

Force acting on the front wheel in the road perpendicular to the direction of travel is expressed as:

$$F_{fy} = \frac{m\sin\Phi}{l_r + l_f}(-\dot{u}z_G + l_f u\dot\theta) \qquad (51)$$

The inventive tire pressure estimation applied for motorcycles is thus adapted with the aid of the algorithms of this section.

Fusion of Wheel Radii and Vibration Based Tire Pressure Estimation

The embodiment of the invention is directed to tire pressure estimation by combining wheel radii based and vibration based methods in an integrated tire pressure model. More specifically, this embodiment employs the results of the different embodiments described above.

Figure 33:
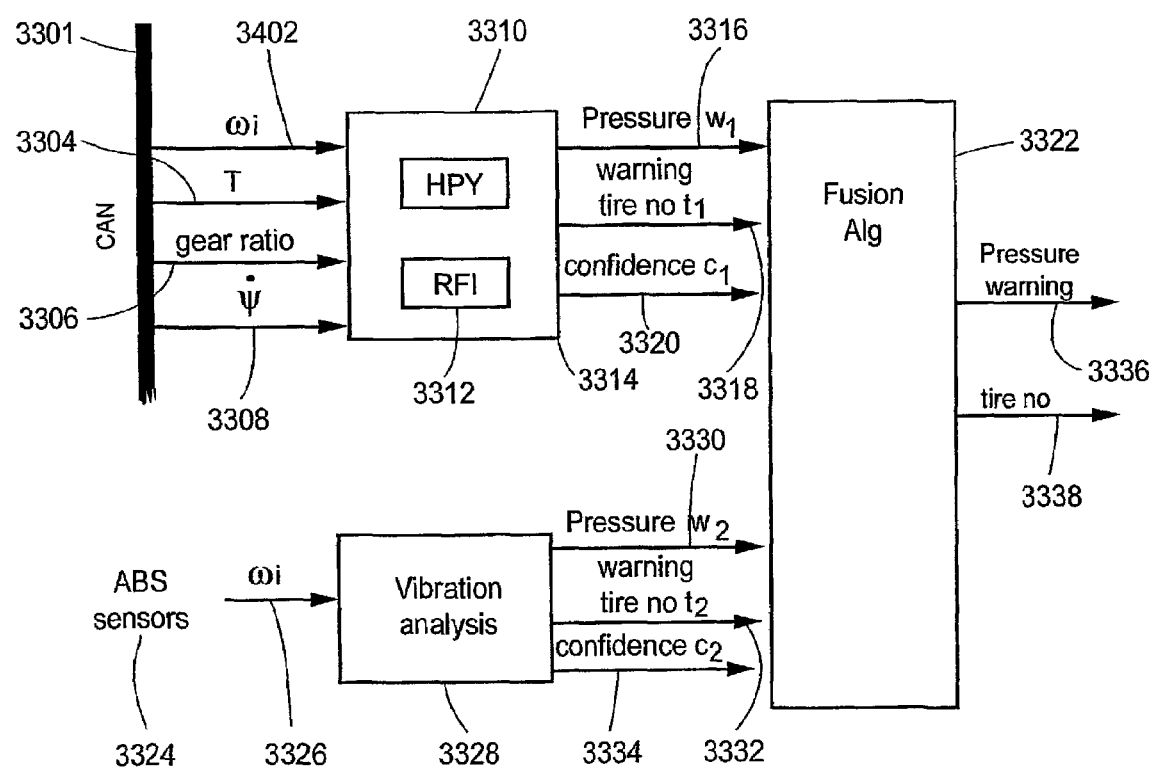
FIGS. 33 and 34 show embodiments for integrating high precision yaw rate and vibration analysis in tire pressure estimation.

FIG. 33 illustrates schematically the functional stages of this embodiment, taking CAN signals 3301, such as angular wheel velocity 3302, torque 3304, gear ratio 3306 and yaw rate 3308 as an input into a model integrating a high precision yaw rate estimation 3310 with a road friction based estimation 3312. The output results in terms of a first pressure warning signal 3316, a first tire identification 3318 and a confidence indication 3320 are taken as an input to an integration model in a fusion algorithm, such as a Kalman filter as described above. Furthermore, input signals in the shape of angular velocity signals 3326 are taken from e.g. ABS sensors 3324 are input inot a vibration based estimation model 3328 as described above. The vibration analysis output in the shape of a second pressure warning 3330, a second tire identification 3332 and a second confidence indication 3334 are input into the integration model 3322. The integration model comprises an adaptive filter for estimating integrated model parameters and thereafter calculating a resulting pressure warning signal 3336 and a resulting tire identification 3338.

Figure 34:
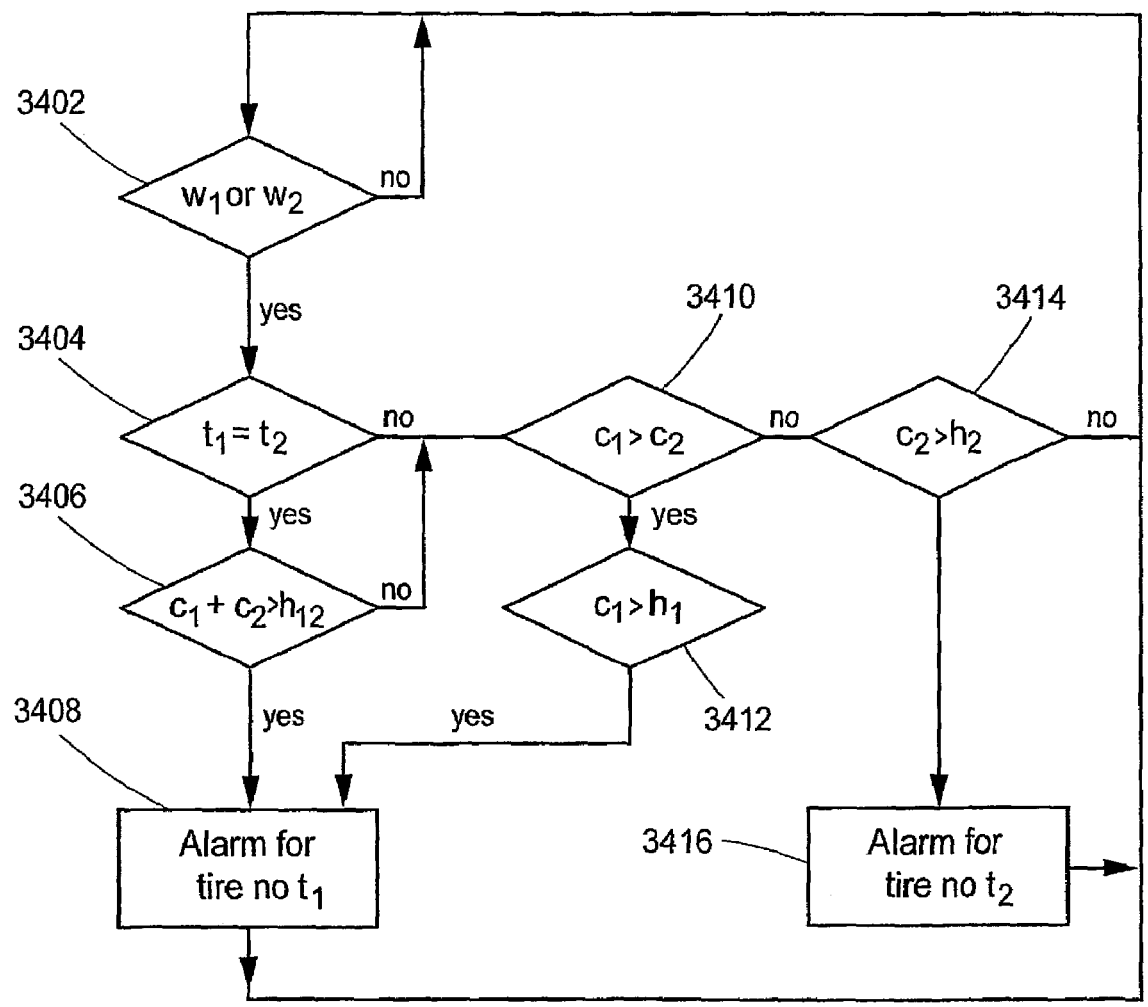

FIG. 34 shows a flow chart for the method of generating a warning in accordance with the steps of 3402 to 3416, using the signals for pressure warning $w_i$, tire $t_i$ and confidence $c_i$ where i=1,2. First there is a check if any of the algorithms signals an alarm. If yes, there is a check if it is the same tire. If yes, the sum of the confidence is compared to a predetermined threshold. If yes, an alarm is sent that tire $t_i$ has low pressure. If the methods have warnings for different tires $t_1 \neq t_2$ the algorithm compares the confidence and the method with largest confidence is then checked to a predetermined threshold. If the confidence is larger than the threshold there is an alarm for that tire.

The invention has been described by means of exemplifying embodiments and it should be appreciated that several designs and combinations are possible within the inventive concept as defined in the claims. Furthermore, all different aspects and functional features of the invention may appear independently applied.

The invention claimed is:

1. A method for estimating the pneumatic pressure of a tire on a wheel of a vehicle, comprising the steps of:
   receiving into data processing means an input of data from a vehicle status sensor signal from a sensor of said vehicle, said sensor signal representing a vehicle status dependent on the pneumatic pressure of said tire;
   calculating, by means of a data processing software implemented filter algorithm, an estimate of first parameter values of a model-based adaptive filter based on a predetermined model on the vehicle status dependent on the vehicle status sensor signal and on the offset for said sensor signal, wherein the offset is estimated by the model-based adaptive filter;
   calculating, dependent on said first parameter values, a first tire pressure indication value being dependent on and indicative of the pneumatic pressure of the tire;
   generating a tire pressure indication signal dependent on said tire pressure indication value; and
   outputting said tire pressure indication signal.

2. The method as recited in claim 1, further comprising the steps of:
   receiving said first vehicle status signal representing the wheel angular velocity of said wheel,
   calculating said first tire pressure indication value based on a predetermined model of the frequency spectrum of vibrations in the tire of said wheel.

3. The method as recited in claim 2, further comprising the steps of:
   calculating a second tire pressure indication value based on a predetermined model of longitudinal dynamics comprising a rolling radius analysis and dependent on said first vehicle status sensor signal representing wheel angular velocity;
   evaluating said first and second tire pressure indication values;
   calculating a resulting tire pressure indication value dependent on said first and second tire pressure indication values;
   generating said tire pressure indication signal dependent on said resulting tire pressure indication value.

4. The method as recited in claim 2, further comprising the steps of:
   receiving a second vehicle status signal representing the lateral movement of said vehicle;
   calculating a second tire pressure indication value based on a predetermined a model of lateral vehicle dynamics dependent on the first vehicle status sensor signal representing the angular velocity of said wheel and on the second vehicle status sensor signal representing the lateral movement of said vehicle;
   evaluating said first and second tire pressure indication values;
   calculating a resulting tire pressure indication value dependent on said first and second tire pressure indication values;
   generating said tire pressure indication signal dependent on said resulting tire pressure indication value.

5. The method as recited in claim 1, further comprising the steps of:
- receiving said first vehicle status signal representing the wheel angular velocity of said wheel and a second vehicle status signal representing the lateral movement of said vehicle;
- calculating said first tire pressure indication value based on a predetermined model of longitudinal dynamics comprising a rolling radius analysis and dependent on said first vehicle status sensor signal representing wheel angular velocity:
- calculating a second tire pressure indication value based on a predetermined model of lateral vehicle dynamics dependent on the first vehicle status sensor signal representing the angular velocity of said wheel and on the second vehicle status sensor signal representing the lateral movement of said vehicle;
- evaluating said first and second tire pressure indication values;
- calculating a resulting tire pressure indication value dependent on said first and second tire pressure indication values;
- generating said tire pressure indication signal dependent on said resulting tire pressure indication value.

6. The method as recited in claim 1, further comprising the steps of:
- receiving said first vehicle status signal representing the wheel angular velocity of said wheel and a second vehicle status signal representing the lateral movement of said vehicle;
- calculating said first tire pressure indication value based on a predetermined model of the frequency spectrum of vibrations in the tire of said wheel dependent on said first vehicle status sensor signal representing wheel angular velocity;
- calculating a second tire pressure indication value based on a predetermined model of longitudinal dynamics comprising a rolling radius analysis and dependent on said first vehicle status sensor signal representing wheel angular velocity;
- calculating a third tire pressure indication value based on a predetermined model of lateral vehicle dynamics dependent on the first vehicle status sensor signal representing the angular velocity of said wheel and on the second vehicle status sensor signal representing the lateral movement of said vehicle;
- evaluating said first, second and third tire pressure indication values;
- calculating a resulting tire pressure indication value dependent on said first, second and third tire pressure indication values;
- generating a tire pressure indication signal dependent on said resulting tire pressure indication value.

7. The method as recited in claim 1, further comprising the steps of:
- receiving said first vehicle status signal representing the wheel angular velocity of said wheel and a second vehicle status signal representing the lateral movement of said vehicle;
- calculating said first tire pressure indication value based on a predetermined model of lateral vehicle dynamics dependent on the first vehicle status sensor signal representing the angular velocity of said wheel and on the second vehicle status sensor signal representing the lateral movement of said vehicle;
- evaluating said first and second tire pressure indication values;
- calculating a resulting tire pressure indication value dependent on said first and second tire pressure indication values;
- generating said tire pressure indication signal dependent on said resulting tire pressure indication value.

8. The method as recited in claim 1, wherein said vehicle status sensor signal represents the angular velocity of said wheel.

9. The method as recited in claim 1, wherein said vehicle status sensor signal represents the lateral movement of said vehicle.

10. The method as recited in claim 9, wherein said vehicle status sensor signal representing the lateral movement is a signal indicating the yaw rate of said vehicle.

11. The method as recited in claim 9, wherein said vehicle status sensor signal representing the lateral movement is a signal indicating the lateral acceleration of said vehicle.

12. The method as recited in claim 1, further comprising the steps of:
- integrating, in an adaptive filter, parameters relating to lateral dynamics and parameters relating to rolling radius phenomena;
- estimating the values of said integrated parameters dependent on said first vehicle status signal of a wheel angular velocity sensor and on said second vehicle status signal of a lateral movement indication sensor;
- calculating an improved lateral movement indication signal dependent on said integrated parameter values.

13. The method as recited in claim 1, further comprising the steps of:
- integrating, in said adaptive filter, parameters relating to lateral dynamics and parameters relating to longitudinal dynamics of said vehicle;
- estimating the values of said integrated parameters dependent on a lateral movement indication signal and on a road friction indication signal derived from a wheel angular velocity signal, a motor torque signal and a gear indicator signal;
- calculating an improved tire pressure indication signal for an identified tire, and possibly also a confidence indication, dependent on said integrated parameter values.

14. The method as recited in claim 13, further comprising the step of interpolating non-equidistant data in said corrected wheel angular velocity signal.

15. The method as recited in claim 1, further being adapted for tire pressure estimation in a motorcycle having two wheels by comprising in said adaptive filter front and rear wheel angular velocity parameters.

16. The method as recited in claim 1, further being adapted for tire pressure estimation in a motorcycle having two wheels by comprising in said adaptive filter a roll angle parameter, the value of which is represented by a roll angle sensor signal.

17. The method as recited in claim 1, wherein said adaptive filter is based on a predetermined model of vibrations in a tire, and said first tire pressure indication value is a resonance frequency.

18. The method as recited in claim 1, wherein the adaptive filter of said predetermined model is a recursive least squares algorithm.

19. The method as recited in claim 18, further comprising the steps of:
- establishing or creating a linear regression model;
- estimating parameter values by means of a Recursive Least Square process, transforming parameters to a resonance frequency.

20. The method as recited in claim 1, wherein the adaptive filter of said predetermined model is a Kalman filter representing a state space model algorithm.

21. The method as recited in claim 20, further comprising the steps of:
   establishing or creating a state space model;
   estimating parameter values by means of a Kalman filtering process;
   transforming parameters to a resonance frequency.

22. The method as recited in claim 1, further comprising the step of pre-processing a vehicle status signal in the shape of a wheel angular velocity signal derived from a toothed wheel sensor with respect to correction of toothed-wheel errors.

23. The method as recited in claim 1, further comprising the step of reducing the sampling frequency of a sampled sensor signal by re-sampling and band pass filtering the input sensor signals into a first and a second frequency band, and by modulating said first and second frequency bands with modulating signals dependent on the lower frequency of each frequency band.

24. The method as recited in claim 1, further comprising the step of:
   integrating, in an adaptive filter, parameters relating to different groups of vehicle status parameters;
   estimating the values of said integrated parameters dependent on a sensor signals representing entities related to said groups of vehicle status parameters;
   calculating a tire pressure indication signal dependent on said integrated parameter values, and possibly also calculating secondary indication signals derived from the values of said integrated parameters.

25. The method as recited in claim 1, further comprising the step of:
   calculating a first estimate of a tire air pressure value dependent on said first tire pressure indication value and a predetermined mapping function or mapping table.

26. The method as recited in claim 1, devised for a plurality of tires on wheels of a vehicle and further comprising the steps of:
   detecting the angular velocity of each wheel by means of wheel speed sensors;
   pre-processing the signal from each wheel speed sensor by means of sensor signal pre-processing means adapted to enhance said signals;
   estimating said first parameter values for each said wheel speed sensor signal;
   carrying out a frequency analysis on each set of said first parameter values by means of frequency analysis means;
   generating for each wheel a calculated tire pressure indication signal;
   processing said tire pressure indication signals in a first logical processing unit dependent on pre-determined rules;
   generating an output signal dependent on said tire pressure indication signals.

27. The method as recited in claim 26, wherein the output signal is a tire pressure indication signal for each wheel.

28. The method as recited in claim 26, wherein the output signal is a warning signal.

29. The method as recited in claim 26, further comprising the steps of:
   receiving the tire pressure indication signals in a second logical unit;
   evaluating and estimating the tire pressures of each wheel;
   generating a second set of improved tire pressure indication signals dependent on predetermined rules.

30. The method as recited in claim 26, further comprising the steps of:
   receiving the tire pressure indication signals in a second logical unit;
   evaluating and estimating the tire pressures of each wheel dependent on said tire pressure indication signals;
   generating a warning signal dependent on predetermined rules.

31. The method as recited in claim 26, further comprising the steps of:
   determining, for each wheel, an estimated slip-offset value dependent on the respective angular velocity signals from the wheel speed sensors;
   evaluating and estimating the tire pressures of each wheel also on said estimated slip-offset value.

32. The method as recited in claim 26, further comprising the steps of:
   determining, for each wheel, an estimated a wheel radius offset value dependent on the respective angular velocity signals from the wheel speed sensors;
   evaluating and estimating the tire pressures of each wheel also on said estimated wheel radius offset value.

33. The method as recited in claim 26, further comprising the steps of:
   analysing, for each wheel, the wheel radius dependent on the respective angular velocity signals from the wheel speed sensors;
   evaluating and estimating the tire pressures of each wheel also on said wheel radius analysis.

34. The method as recited in claim 1, wherein said tire pressure indication signal is used as a tire pressure estimate.

35. The method as recited in claim 1, further comprising the steps of:
   detecting changes in said tire pressure indication signal;
   generating an alarm signal in response to detected changes according to predetermined rules.

36. The method as recited in claim 1, wherein said tire pressure indication signal is an analogue signal, a sampled signal or data representing a tire pressure indication.

37. A computer program product for estimating the pneumatic pressure of a tire on a wheel of a vehicle, comprising program code adapted to direct a data processing system of a digital computer, the computer program code comprising sets of instructions adapted to:
   receiving into data processing means an input of data from a vehicle status sensor signal from a sensor of said vehicle, said sensor signal representing a vehicle status dependent on the pneumatic pressure of said tire;
   calculating, by means of a data processing software implemented filter algorithm, an estimate of first parameter values of a model-based adaptive filter based on a predetermined model on the vehicle status dependent on the vehicle status sensor signal and on the offset for said sensor signal, wherein the offset is estimated by the model-based adaptive filter;
   calculating, dependent on said first parameter values, a first tire pressure indication value being dependent on and indicative of the pneumatic pressure of the tire;
   generating a tire pressure indication signal dependent on said tire pressure indication value; and
   outputting said tire pressure indication signal.

38. The computer program product as recited in claim 37, further comprising program code instructions adapted to direct said data processing system.

39. An apparatus for estimating the pneumatic pressure of a tire on a wheel of a vehicle, comprising:
  an input interface adapted for receiving into data processing means an input of data from a vehicle status sensor signal from a sensor of said vehicle, said sensor signal representing a vehicle status dependent on the pneumatic pressure of said tire;
  a data processing apparatus adapted for:
  calculating, by means of a data processing software implemented filter algorithm, an estimate of first parameter values of a model-based adaptive filter based on a predetermined model on the vehicle status dependent on the vehicle status sensor signal and on the offset for said sensor signal, wherein the offset is estimated by the model-based adaptive filter;
  calculating, dependent on said first parameter values, a first tire pressure indication value being dependent on and indicative of the pneumatic pressure of the tire;
  generating a tire pressure indication signal dependent on said tire pressure indication value; and
  an output interface adapted for outputting said tire pressure indication signal.

40. The apparatus as recited in claim 39, further comprising functional components adapted to perform the steps and functions of the claimed invention.

* * * * *